(12) United States Patent  (10) Patent No.: US 8,237,830 B2
Jannard et al.  (45) Date of Patent: Aug. 7, 2012

(54) VIDEO CAMERA

(75) Inventors: James Jannard, Las Vegas, NV (US); Thomas Graeme Nattress, Kars, CA (US)

(73) Assignee: RED.COM, Inc., Lake Forest, CA (US)

(*) Notice: Subject to any disclaimer, the term of this patent is extended or adjusted under 35 U.S.C. 154(b) by 368 days.

(21) Appl. No.: 12/422,507

(22) Filed: Apr. 13, 2009

(65) Prior Publication Data

US 2010/0013963 A1  Jan. 21, 2010

Related U.S. Application Data

(63) Continuation-in-part of application No. 12/101,882, filed on Apr. 11, 2008.

(60) Provisional application No. 60/911,196, filed on Apr. 11, 2007, provisional application No. 61/017,406, filed on Dec. 28, 2007.

(51) Int. Cl.
*H04N 5/335* (2006.01)
*G06K 9/36* (2006.01)

(52) U.S. Cl. ........................ 348/273; 382/166

(58) Field of Classification Search ............... 348/222.1, 348/223.1, 270–280; 382/167, 300
See application file for complete search history.

(56) References Cited

U.S. PATENT DOCUMENTS

| | | | |
|---|---|---|---|
| 3,972,010 A | 7/1976 | Dolby | |
| 4,200,889 A | 4/1980 | Strobele | |
| 4,316,213 A | 2/1982 | Wharton et al. | |
| 4,561,012 A | 12/1985 | Acampora | |
| 5,016,107 A | 5/1991 | Sasson et al. | |
| 5,040,063 A | 8/1991 | Citta et al. | |
| 5,049,983 A | 9/1991 | Matsumoto et al. | |
| 5,249,053 A | 9/1993 | Jain | |
| 5,255,083 A | 10/1993 | Capitant et al. | |
| 5,303,062 A | 4/1994 | Kawarai | |
| 5,343,243 A | 8/1994 | Maeda | |
| 5,526,047 A | 6/1996 | Sawanobori | |
| 5,535,246 A | 7/1996 | Beech | |
| 5,537,157 A | 7/1996 | Washino et al. | |
| 5,563,655 A | 10/1996 | Lathrop | |

(Continued)

FOREIGN PATENT DOCUMENTS

EP  1605403  12/2005

(Continued)

OTHER PUBLICATIONS

CineForm Insider—Nov. 13, 2007.

(Continued)

*Primary Examiner* — Trung Diep
(74) *Attorney, Agent, or Firm* — Knobbe Martens Olson & Bear LLP

(57) ABSTRACT

Embodiments provide a video camera that can be configured to highly compress video data in a visually lossless manner. The camera can be configured to transform blue and red image data in a manner that enhances the compressibility of the data. The data can then be compressed and stored in this form. This allows a user to reconstruct the red and blue data to obtain the original raw data for a modified version of the original raw data that is visually lossless when demosaiced. Additionally, the data can be processed in a manner in which the green image elements are demosaiced first and then the red and blue elements are reconstructed based on values of the demosaiced green image elements.

27 Claims, 31 Drawing Sheets

U.S. PATENT DOCUMENTS

| | | |
|---|---|---|
| 5,592,224 A | 1/1997 | Shim |
| 5,592,237 A | 1/1997 | Greenway |
| 5,818,524 A | 10/1998 | Juen |
| 5,949,468 A | 9/1999 | Asahina et al. |
| 5,991,515 A | 11/1999 | Fall et al. |
| 5,999,220 A | 12/1999 | Washino |
| 6,009,201 A | 12/1999 | Acharya |
| 6,154,493 A | 11/2000 | Acharya et al. |
| 6,192,086 B1 | 2/2001 | Darr |
| 6,198,505 B1 | 3/2001 | Turner et al. |
| 6,262,763 B1 | 7/2001 | Totsuka |
| 6,269,217 B1 | 7/2001 | Rodriguez |
| RE37,342 E | 8/2001 | Washino et al. |
| 6,275,263 B1 | 8/2001 | Hu |
| 6,285,794 B1 | 9/2001 | Georgiev et al. |
| 6,314,206 B1 | 11/2001 | Sato |
| 6,466,699 B1 | 10/2002 | Schwartz et al. |
| RE38,079 E | 4/2003 | Washino et al. |
| 6,567,988 B1 | 5/2003 | Okawa |
| 6,597,860 B2 | 7/2003 | Song et al. |
| 6,697,106 B1 | 2/2004 | Saito |
| 6,825,876 B1 | 11/2004 | Easwar et al. |
| 6,859,226 B2 | 2/2005 | Kawamura et al. |
| 6,867,717 B1 | 3/2005 | Ion |
| 6,937,276 B2 | 8/2005 | Chung |
| 6,958,774 B2 | 10/2005 | Kuroiwa |
| 6,983,074 B1 | 1/2006 | Clauson et al. |
| 6,990,240 B2 | 1/2006 | Hagiwara |
| 6,995,793 B1 | 2/2006 | Albadawi et al. |
| 6,995,794 B2 | 2/2006 | Hsu et al. |
| 7,038,719 B2 | 5/2006 | Hirai |
| 7,050,642 B2 | 5/2006 | Graffagnino |
| 7,095,899 B2 | 8/2006 | Malvar |
| 7,126,634 B2 | 10/2006 | Kato |
| 7,127,116 B2 | 10/2006 | Goldstein et al. |
| 7,155,066 B2 | 12/2006 | Baharav |
| 7,174,045 B2 | 2/2007 | Yokonuma |
| 7,212,313 B1 | 5/2007 | Hoel |
| 7,312,821 B2 | 12/2007 | Voss |
| 7,313,286 B2 | 12/2007 | Schwartz et al. |
| 7,324,141 B2 | 1/2008 | Kubo et al. |
| 7,343,043 B2 | 3/2008 | Yokonuma |
| 7,365,658 B2 | 4/2008 | Todorov et al. |
| 7,369,161 B2 | 5/2008 | Easwar et al. |
| 7,385,647 B2 | 6/2008 | Park |
| 7,388,992 B2 | 6/2008 | Atsumi et al. |
| 7,394,485 B2 | 7/2008 | Kim |
| 7,477,781 B1 | 1/2009 | Tanbakuchi |
| 7,483,909 B2 | 1/2009 | Sena et al. |
| 7,512,283 B2 | 3/2009 | Brower |
| 7,577,689 B1 | 8/2009 | Masinter et al. |
| 7,590,301 B2 | 9/2009 | Wu |
| 7,609,300 B2 | 10/2009 | Wu |
| 7,796,186 B2 | 9/2010 | Oshima |
| 7,830,967 B1 | 11/2010 | Jannard et al. |
| 7,936,919 B2 * | 5/2011 | Kameyama ............... 382/167 |
| 7,937,919 B2 * | 5/2011 | Coers et al. ............... 56/15.8 |
| 2002/0041707 A1 | 4/2002 | Newman |
| 2002/0063787 A1 | 5/2002 | Watanabe |
| 2002/0196354 A1* | 12/2002 | Chang et al. ............... 348/246 |
| 2003/0007567 A1 | 1/2003 | Newman et al. |
| 2003/0011747 A1 | 1/2003 | Lenz |
| 2003/0038885 A1 | 2/2003 | Rodriguez |
| 2003/0156188 A1 | 8/2003 | Abrams, Jr. |
| 2003/0185302 A1 | 10/2003 | Abrams, Jr. |
| 2003/0202106 A1 | 10/2003 | Kandleinsberger et al. |
| 2004/0051793 A1 | 3/2004 | Tecu |
| 2004/0095477 A1 | 5/2004 | Maki et al. |
| 2004/0196389 A1 | 10/2004 | Honda |
| 2004/0201701 A1 | 10/2004 | Takagi |
| 2004/0246346 A1 | 12/2004 | Kim et al. |
| 2005/0276496 A1 | 12/2005 | Molgaard et al. |
| 2006/0007324 A1* | 1/2006 | Takei ............... 348/223.1 |
| 2006/0012694 A1* | 1/2006 | Yoneda et al. ............... 348/246 |
| 2006/0061659 A1 | 3/2006 | Niwa |
| 2006/0114987 A1 | 6/2006 | Roman |
| 2006/0165178 A1* | 7/2006 | Ma et al. ............... 375/240.16 |
| 2006/0165179 A1* | 7/2006 | Feuer et al. ............... 375/240.18 |
| 2006/0170786 A1 | 8/2006 | Won |
| 2006/0221199 A1 | 10/2006 | Nakajima |
| 2006/0221203 A1 | 10/2006 | Abe et al. |
| 2006/0221230 A1 | 10/2006 | Dutt et al. |
| 2007/0035636 A1* | 2/2007 | Wu ............... 348/223.1 |
| 2007/0041634 A1 | 2/2007 | Sugimori |
| 2007/0127095 A1 | 6/2007 | Sugimori |
| 2007/0153093 A1 | 7/2007 | Lin et al. |
| 2007/0160142 A1 | 7/2007 | Abrams, Jr. |
| 2007/0216782 A1 | 9/2007 | Chernoff |
| 2007/0285517 A1 | 12/2007 | Ishikuro |
| 2008/0002035 A1 | 1/2008 | Yoshida |
| 2008/0018746 A1 | 1/2008 | Kawanami |
| 2008/0062272 A1 | 3/2008 | Kuroiwa |
| 2008/0079818 A1 | 4/2008 | Takahashi |
| 2008/0301315 A1 | 12/2008 | Cheng et al. |
| 2009/0052797 A1 | 2/2009 | Matsushita |
| 2009/0052861 A1 | 2/2009 | Goldman |
| 2009/0080784 A1 | 3/2009 | Luh et al. |

FOREIGN PATENT DOCUMENTS

| | | |
|---|---|---|
| WO | WO 91/01613 A1 | 2/1991 |
| WO | WO9709818 A1 | 3/1997 |
| WO | WO2008128112 | 10/2008 |

OTHER PUBLICATIONS

CineForm Online Workflow Solutions for Film and Video—Nov. 1, 2006.
CineForm RAW—Technology Overview and Workflow, Apr. 13, 2006.
CinemaTechnic Camera Profiles | ARRI 16SR, 2001.
Dalsa Technology with Vision, Mar. 2003.
Digital Negative (DNG) Specification, Apr. 2008.
JPEG 2000 still image coding versus other standards, Jul. 2000.
Phantom 65 the world's first 65mm digital cinema, Nov. 22, 2006.
Arriflex D-20 Preliminary Specifications, May 31, 2005, www.arri.com, [online], http://web.archive.org/web/20050531010626/www.arri.com/entry/products.htm, pp. 1-2.
Arrflex D-21: The Film Style Diqial Camera, Jan. 4, 2008, www.arri.de, [online] http://www.arri.de/press/press/press_release.html?tx_ttnews[tt_news]=_32&tx_ttnews[backPid]=1781&cHash=e89c9b0855.
Silicon Imaging SI-2K Mini Full Specifications, May 23, 2007, www.siliconimaging.com, [online], http://web.archive.org/web/20070523223217/www.siliconimaging.com/DigitalCinema/SI_2K_full_specifications.html, pp. 1-2.
Phantom 65, Feb. 4, 2007, www.visionresearch.com, [online], http://web.archive.org/web/20070204110551/www.visionresearch.com/index.cfm?sector=htm/files&page=camera_65_new, pp. 1-2.
International Search Report and Written Opinion in PCT/US08/60126 dated Jul. 7, 2008.
European Communication pursuant to Rule 62 EPC, issued Aug. 4, 2011, in 7 pages.
Constant quality JPEG2000 rate control for digital cinema; Smith, Michael D; Villasenor, John; Source: Proceedings of SPIE—The International Society for Optical Engineering, v 6508, n Part 1, 2007, Conference: Visual Communications and Image Processing 2007, Jan. 30, 2007-Feb. 1, 2007.
Examination Report from Australian Patent Office in Australian Patent Application No. 2008240144.
Mitani, K; Shimamoto, H; Fujita, Y; A 4 K × 2 K-pixel color image pickup system; IEICE Transactions on Information and Systems; E82D (8): 1219-1227; Aug. 1999.
Smith, Michael D; Villasenor, John; Constant quality JPEG2000 rate control for digital cinema; Source: Proceedings of SPIE—The International Society for Optical Engineering, v 6508, n Part 1, 2007, Conference: Visual Communications and Image Processing 2007, Jan. 30, 2007-Feb. 1, 2007.
Mitani, K; Sugawara, M; Shimamoto, H; Yamashita, T; Okano, F; Ultrahigh-definition color video camera system with 4K-scanning lines; Sensors and Camera Systems for Scientific, Industrial, and Digital Photography Applications IV, 5017: 159-166, 2003.

Gamma Correction, www.broadcastengineering.com [online], dated Jan. 1, 2005 in 5 pages.

European Communication pursuant to Rule 114(2) EPC, issued on Mar. 30, 2010 in Application No. 08745686.9, in 5 pages.

Silicon Imaging Support: Frequently-Asked-Questions, Aug. 13, 2008, www.siliconimaging.com, [online], http://web.archive.org/web/20080610162715/www.siliconimaging.com/DiqitalCinema/SiliconImaging_faq.html, in 14 pages.

Silicon Imaging Support: Frequently-Asked-Questions, Dec. 17, 2008, www.siliconimaging.com, [online], http://web.archive.org/web/20071212165310/www.siliconimaging.com/DigitalCinema/SiliconImaging_faq.html, in 12 pages.

CineForm Raw—Dalsa and Vision Research Raw File Converters, Jul. 22, 2008, www.cineform.com, [online], http://web.archive.org/web/20080411213717/www.cineform.com/products/TechNotes/RawConvert.htm, in 4 pages.

International Search Report and Written Opinion for PCT Application No. PCT/US2010/028808, dated Aug. 3, 2010 in 12 pages.

* cited by examiner

| | m-3 | m-2 | m-1 | m | m+1 | m+2 | m+3 | m+4 |
|---|---|---|---|---|---|---|---|---|
| n-3 | $B_{m-3,n-3}$ | $G_{m-2,n-3}$ | $B_{m-1,n-3}$ | $G_{m,n-3}$ | $B_{m+1,n-3}$ | $G_{m+2,n-3}$ | $B_{m+3,n-3}$ | $G_{m+4,n-3}$ |
| n-2 | $G_{m-3,n-2}$ | $R_{m-2,n-2}$ | $G_{m-1,n-2}$ | $R_{m,n-2}$ | $G_{m+1,n-2}$ | $R_{m+2,n-2}$ | $G_{m+3,n-2}$ | $R_{m+4,n-2}$ |
| n-1 | $B_{m-3,n-1}$ | $G_{m-2,n-1}$ | $B_{m-1,n-1}$ | $G_{m,n-1}$ | $B_{m+1,n-1}$ | $G_{m+2,n-1}$ | $B_{m+3,n-1}$ | $G_{m+4,n-1}$ |
| n | $G_{m-3,n}$ | $R_{m-2,n}$ | $G_{m-1,n}$ | $R_{m,n}$ | $G_{m+1,n}$ | $R_{m+2,n}$ | $G_{m+3,n}$ | $R_{m+4,n}$ |
| n+1 | $B_{m-3,n+1}$ | $G_{m-2,n+1}$ | $B_{m-1,n+1}$ | $G_{m,n+1}$ | $B_{m+1,n+1}$ | $G_{m+2,n+1}$ | $B_{m+3,n+1}$ | $G_{m+4,n+1}$ |
| n+2 | $G_{m-3,n+2}$ | $R_{m-2,n+2}$ | $G_{m-1,n+2}$ | $R_{m,n+2}$ | $G_{m+1,n+2}$ | $R_{m+2,n+2}$ | $G_{m+3,n+2}$ | $R_{m+4,n+2}$ |
| n+3 | $B_{m-3,n+3}$ | $G_{m-2,n+3}$ | $B_{m-1,n+3}$ | $G_{m,n+3}$ | $B_{m+1,n+3}$ | $G_{m+2,n+3}$ | $B_{m+3,n+3}$ | $G_{m+4,n+3}$ |
| n+4 | $G_{m-3,n+4}$ | $R_{m-2,n+4}$ | $G_{m-1,n+4}$ | $R_{m,n+4}$ | $G_{m+1,n+4}$ | $R_{m+2,n+4}$ | $G_{m+3,n+4}$ | $R_{m+4,n+4}$ |

*FIG. 3*

| | n-3 | n-2 | n-1 | n | n+1 | n+2 | n+3 | n+4 |
|---|---|---|---|---|---|---|---|---|
| m+4 | $G_{m+4,n-3}$ | | $G_{m+4,n-1}$ | | $G_{m+4,n+1}$ | | $G_{m+4,n+3}$ | |
| m+3 | | $G_{m+3,n-2}$ | | $G_{m+3,n}$ | | $G_{m+3,n+2}$ | | $G_{m+3,n+4}$ |
| m+2 | $G_{m+2,n-3}$ | | $G_{m+2,n-1}$ | | $G_{m+2,n+1}$ | | $G_{m+2,n+3}$ | |
| m+1 | | $G_{m+1,n-2}$ | | $G_{m+1,n}$ | | $G_{m+1,n+2}$ | | $G_{m+1,n+4}$ |
| m | $G_{m,n-3}$ | | $G_{m,n-1}$ | | $G_{m,n+1}$ | | $G_{m,n+3}$ | |
| m-1 | | $G_{m-1,n-2}$ | | $G_{m-1,n}$ | | $G_{m-1,n+2}$ | | $G_{m-1,n+4}$ |
| m-2 | $G_{m-2,n-3}$ | | $G_{m-2,n-1}$ | | $G_{m-2,n+1}$ | | $G_{m-2,n+3}$ | |
| m-3 | | $G_{m-3,n-2}$ | | $G_{m-3,n}$ | | $G_{m-3,n+2}$ | | $G_{m-3,n+4}$ |

GREEN 1

| $G_{m-2,n-3}$ | $G_{m,n-3}$ | $G_{m+2,n-3}$ | $G_{m+4,n-3}$ |
|---|---|---|---|
| $G_{m-2,n-1}$ | $G_{m,n-1}$ | $G_{m+2,n-1}$ | $G_{m+4,n-1}$ |
| $G_{m-2,n+1}$ | $G_{m,n+1}$ | $G_{m+2,n+1}$ | $G_{m+4,n+1}$ |
| $G_{m-2,n+3}$ | $G_{m,n+3}$ | $G_{m+2,n+3}$ | $G_{m+4,n+3}$ |

GREEN 2

| $G_{m-3,n-2}$ | $G_{m-1,n-2}$ | $G_{m+1,n-2}$ | $G_{m+3,n-2}$ |
|---|---|---|---|
| $G_{m-3,n}$ | $G_{m-1,n}$ | $G_{m+1,n}$ | $G_{m+3,n}$ |
| $G_{m-3,n+2}$ | $G_{m-1,n+2}$ | $G_{m+1,n+2}$ | $G_{m+3,n+2}$ |
| $G_{m-3,n+4}$ | $G_{m-1,n+4}$ | $G_{m+1,n+4}$ | $G_{m+3,n+4}$ |

BLUE

| $B_{m-3,n-3}$ | $B_{m-1,n-3}$ | $B_{m+1,n-3}$ | $B_{m+3,n-3}$ |
|---|---|---|---|
| $B_{m-3,n-1}$ | $B_{m-1,n-1}$ | $B_{m+1,n-1}$ | $B_{m+3,n-1}$ |
| $B_{m-3,n+1}$ | $B_{m-1,n+1}$ | $B_{m+1,n+1}$ | $B_{m+3,n+1}$ |
| $B_{m-3,n+3}$ | $B_{m-1,n+3}$ | $B_{m+1,n+3}$ | $B_{m+3,n+3}$ |

RED

| $R_{m-2,n-2}$ | $R_{m,n-2}$ | $R_{m+2,n-2}$ | $R_{m+4,n-2}$ |
|---|---|---|---|
| $R_{m-2,n}$ | $R_{m,n}$ | $R_{m+2,n}$ | $R_{m+4,n}$ |
| $R_{m-2,n+2}$ | $R_{m,n+2}$ | $R_{m+2,n+2}$ | $R_{m+4,n+2}$ |
| $R_{m-2,n+4}$ | $R_{m,n+4}$ | $R_{m+2,n+4}$ | $R_{m+4,n+4}$ |

|  | $n-3$ | $n-2$ | $n-1$ | $n$ | $n+1$ | $n+2$ | $n+3$ | $n+4$ |
|---|---|---|---|---|---|---|---|---|
| $m-3$ | $DG_{m-3,n-3}$ | $G_{m-3,n-2}$ | $DG_{m-3,n-1}$ | $G_{m-3,n}$ | $DG_{m-3,n+1}$ | $G_{m-3,n+2}$ | $DG_{m-3,n+3}$ | $G_{m-3,n+4}$ |
| $m-2$ | $G_{m-2,n-3}$ | $DG_{m-2,n-2}$ | $G_{m-2,n-1}$ | $DG_{m-2,n}$ | $G_{m-2,n+1}$ | $DG_{m-2,n+2}$ | $G_{m-2,n+3}$ | $DG_{m-2,n+4}$ |
| $m-1$ | $DG_{m-1,n-3}$ | $G_{m-1,n-2}$ | $DG_{m-1,n-1}$ | $G_{m-1,n}$ | $DG_{m-1,n+1}$ | $G_{m-1,n+2}$ | $DG_{m-1,n+3}$ | $G_{m-1,n+4}$ |
| $m$ | $G_{m,n-3}$ | $DG_{m,n-2}$ | $G_{m,n-1}$ | $DG_{m,n}$ | $G_{m,n+1}$ | $DG_{m,n+2}$ | $G_{m,n+3}$ | $DG_{m,n+4}$ |
| $m+1$ | $DG_{m+1,n-3}$ | $G_{m+1,n-2}$ | $DG_{m+1,n-1}$ | $G_{m+1,n}$ | $DG_{m+1,n+1}$ | $G_{m+1,n+2}$ | $DG_{m+1,n+3}$ | $G_{m+1,n+4}$ |
| $m+2$ | $G_{m+2,n-3}$ | $DG_{m+2,n-2}$ | $G_{m+2,n-1}$ | $DG_{m+2,n}$ | $G_{m+2,n+1}$ | $DG_{m+2,n+2}$ | $G_{m+2,n+3}$ | $DG_{m+2,n+4}$ |
| $m+3$ | $DG_{m+3,n-3}$ | $G_{m+3,n-2}$ | $DG_{m+3,n-1}$ | $G_{m+3,n}$ | $DG_{m+3,n+1}$ | $G_{m+3,n+2}$ | $DG_{m+3,n+3}$ | $G_{m+3,n+4}$ |
| $m+4$ | $G_{m+4,n-3}$ | $DG_{m+4,n-2}$ | $G_{m+4,n-1}$ | $DG_{m+4,n}$ | $G_{m+4,n+1}$ | $DG_{m+4,n+2}$ | $G_{m+4,n+3}$ | $DG_{m+4,n+4}$ |

| | m-3 | m-2 | m-1 | m | m+1 | m+2 | m+3 | m+4 |
|---|---|---|---|---|---|---|---|---|
| n-3 | $DG_{m-3,n-3}$ | $DG_{m-2,n-3}$ | $DG_{m-1,n-3}$ | $DG_{m,n-3}$ | $DG_{m+1,n-3}$ | $DG_{m+2,n-3}$ | $DG_{m+3,n-3}$ | $DG_{m+4,n-3}$ |
| n-2 | $G_{m-3,n-2}$ | $DG_{m-2,n-2}$ | $G_{m-1,n-2}$ | $DG_{m,n-2}$ | $G_{m+1,n-2}$ | $DG_{m+2,n-2}$ | $G_{m+3,n-2}$ | $DG_{m+4,n-2}$ |
| n-1 | $DG_{m-3,n-1}$ | $DG_{m-2,n-1}$ | $DG_{m-1,n-1}$ | $DG_{m,n-1}$ | $DG_{m+1,n-1}$ | $DG_{m+2,n-1}$ | $DG_{m+3,n-1}$ | $DG_{m+4,n-1}$ |
| n | $G_{m-3,n}$ | $DG_{m-2,n}$ | $G_{m-1,n}$ | $DG_{m,n}$ | $G_{m+1,n}$ | $DG_{m+2,n}$ | $G_{m+3,n}$ | $DG_{m+4,n}$ |
| n+1 | $DG_{m-3,n+1}$ | $DG_{m-2,n+1}$ | $DG_{m-1,n+1}$ | $DG_{m,n+1}$ | $DG_{m+1,n+1}$ | $DG_{m+2,n+1}$ | $DG_{m+3,n+1}$ | $DG_{m+4,n+1}$ |
| n+2 | $G_{m-3,n+2}$ | $DG_{m-2,n+2}$ | $G_{m-1,n+2}$ | $DG_{m,n+2}$ | $G_{m+1,n+2}$ | $DG_{m+2,n+2}$ | $G_{m+3,n+2}$ | $DG_{m+4,n+2}$ |
| n+3 | $DG_{m-3,n+3}$ | $DG_{m-2,n+3}$ | $DG_{m-1,n+3}$ | $DG_{m,n+3}$ | $DG_{m+1,n+3}$ | $DG_{m+2,n+3}$ | $DG_{m+3,n+3}$ | $DG_{m+4,n+3}$ |
| n+4 | $G_{m-3,n+4}$ | $DG_{m-2,n+4}$ | $G_{m-1,n+4}$ | $DG_{m,n+4}$ | $G_{m+1,n+4}$ | $DG_{m+2,n+4}$ | $G_{m+3,n+4}$ | $DG_{m+4,n+4}$ |

*FIG. 14*

|  | n-3 | n-2 | n-1 | n | n+1 | n+2 | n+3 | n+4 |
|---|---|---|---|---|---|---|---|---|
| m+4 |  |  |  |  |  |  |  |  |
| m+3 | $B_{m+3,n-3}$ |  | $B_{m+3,n-1}$ |  | $B_{m+3,n+1}$ |  | $B_{m+3,n+3}$ |  |
| m+2 |  |  |  |  |  |  |  |  |
| m+1 | $B_{m+1,n-3}$ |  | $B_{m+1,n-1}$ |  | $B_{m+1,n+1}$ |  | $B_{m+1,n+3}$ |  |
| m |  |  |  |  |  |  |  |  |
| m-1 | $B_{m-1,n-3}$ |  | $B_{m-1,n-1}$ |  | $B_{m-1,n+1}$ |  | $B_{m-1,n+3}$ |  |
| m-2 |  |  |  |  |  |  |  |  |
| m-3 | $B_{m-3,n-3}$ |  | $B_{m-3,n-1}$ |  | $B_{m-3,n+1}$ |  | $B_{m-3,n+3}$ |  |

FIG. 15

|   | m-3 | m-2 | m-1 | m | m+1 | m+2 | m+3 | m+4 |
| --- | --- | --- | --- | --- | --- | --- | --- | --- |
| n-3 | $B_{m-3,n-3}$ | $DB_{m-2,n-3}$ | $B_{m-1,n-3}$ | $DB_{m,n-3}$ | $B_{m+1,n-3}$ | $DB_{m+2,n-3}$ | $B_{m+3,n-3}$ | $DB_{m+4,n-3}$ |
| n-2 | $DB_{m-3,n-2}$ | $DB_{m-2,n-2}$ | $DB_{m-1,n-2}$ | $DB_{m,n-2}$ | $DB_{m+1,n-2}$ | $DB_{m+2,n-2}$ | $DB_{m+3,n-2}$ | $DB_{m+4,n-2}$ |
| n-1 | $B_{m-3,n-1}$ | $DB_{m-2,n-1}$ | $B_{m-1,n-1}$ | $DB_{m,n-1}$ | $B_{m+1,n-1}$ | $DB_{m+2,n-1}$ | $B_{m+3,n-1}$ | $DB_{m+4,n-1}$ |
| n | $DB_{m-3,n}$ | $DB_{m-2,n}$ | $DB_{m-1,n}$ | $DB_{m,n}$ | $DB_{m+1,n}$ | $DB_{m+2,n}$ | $DB_{m+3,n}$ | $DB_{m+4,n}$ |
| n+1 | $B_{m-3,n+1}$ | $DB_{m-2,n+1}$ | $B_{m-1,n+1}$ | $DB_{m,n+1}$ | $B_{m+1,n+1}$ | $DB_{m+2,n+1}$ | $B_{m+3,n+1}$ | $DB_{m+4,n+1}$ |
| n+2 | $DB_{m-3,n+2}$ | $DB_{m-2,n+2}$ | $DB_{m-1,n+2}$ | $DB_{m,n+2}$ | $DB_{m+1,n+2}$ | $DB_{m+2,n+2}$ | $DB_{m+3,n+2}$ | $DB_{m+4,n+2}$ |
| n+3 | $B_{m-3,n+3}$ | $DB_{m-2,n+3}$ | $B_{m-1,n+3}$ | $DB_{m,n+3}$ | $B_{m+1,n+3}$ | $DB_{m+2,n+3}$ | $B_{m+3,n+3}$ | $DB_{m+4,n+3}$ |
| n+4 | $DB_{m-3,n+4}$ | $DB_{m-2,n+4}$ | $DB_{m-1,n+4}$ | $DB_{m,n+4}$ | $DB_{m+1,n+4}$ | $DB_{m+2,n+4}$ | $DB_{m+3,n+4}$ | $DB_{m+4,n+4}$ |

| G1 | B | G1 | B | G1 |
|---|---|---|---|---|
| R | G2 | R | G2 | R |
| G1 | B | G1 | B | G1 |
| R | G2 | R | G2 | R |
| G1 | B | G1 | B | G1 |

VIDEO CAMERA

CROSS-REFERENCE TO RELATED APPLICATIONS

This application is a continuation-in-part of U.S. patent application Ser. No. 12/101,882, filed on Apr. 11, 2008, entitled "VIDEO CAMERA," which claims benefit under 35 U.S.C. §119(e) to U.S. Provisional Patent Application Nos. 60/911,196, filed Apr. 11, 2007, and 61/017,406, filed Dec. 28, 2007, the entire contents of which is hereby incorporated by reference.

BACKGROUND

1. Field of the Inventions

The present inventions are directed to digital cameras, such as those for capturing still or moving pictures, and more particularly, to digital cameras that compress image data.

2. Description of the Related Art

Despite the availability of digital video cameras, the producers of major motion pictures and some television broadcast media continue to rely on film cameras. The film used for such provides video editors with very high resolution images that can be edited by conventional means. More recently, however, such film is often scanned, digitized and digitally edited.

SUMMARY OF THE INVENTIONS

Although some currently available digital video cameras include high resolution image sensors, and thus output high resolution video, the image processing and compression techniques used on board such cameras are too lossy and thus eliminate too much raw image data to be acceptable in the high end portions of the market noted above. An aspect of at least one of the embodiments disclosed herein includes the realization that video quality that is acceptable for the higher end portions of the markets noted above, such as the major motion picture market, can be satisfied by cameras that can capture and store raw or substantially raw video data having a resolution of at least about 2k and at a frame rate of at least about 23 frames per second.

Thus, in accordance with an embodiment, a video camera can comprise a portable housing, and a lens assembly supported by the housing and configured to focus light. A light sensitive device can be configured to convert the focused light into raw image data with a resolution of at least 2k at a frame rate of at least about twenty-three frames per second. The camera can also include a memory device and an image processing system configured to compress and store in the memory device the raw image data at a compression ratio of at least six to one and remain substantially visually lossless, and at a rate of at least about 23 frames per second.

In accordance with another embodiment, a method of recording a motion video with a camera can comprise guiding light onto a light sensitive device. The method can also include converting the light received by the light sensitive device into raw digital image data at a rate of at least greater than twenty three frames per second, compressing the raw digital image data, and recording the raw image data at a rate of at least about 23 frames per second onto a storage device.

In accordance with yet another embodiment, a video camera can comprise a lens assembly supported by the housing and configured to focus light and a light sensitive device configured to convert the focused light into a signal of raw image data representing the focused light. The camera can also include a memory device and means for compressing and recording the raw image data at a frame rate of at least about 23 frames per second.

In accordance with yet another embodiment, a video camera can comprise a portable housing having at least one handle configured to allow a user to manipulate the orientation with respect to at least one degree of movement of the housing during a video recording operation of the camera. A lens assembly can comprise at least one lens supported by the housing and configured to focus light at a plane disposed inside the housing. A light sensitive device can be configured to convert the focused light into raw image data with a horizontal resolution of at least 2k and at a frame rate of at least about twenty three frames per second. A memory device can also be configured to store video image data. An image processing system can be configured to compress and store in the memory device the raw image data at a compression ratio of at least six to one and remain substantially visually lossless, and at a rate of at least about 23 frames per second.

Another aspect of at least one of the inventions disclosed herein includes the realization that because the human eye is more sensitive to green wavelengths than any other color, green image data based modification of image data output from an image sensor can be used to enhance compressibility of the data, yet provide a higher quality video image. One such technique can include subtracting the magnitude of green light detected from the magnitudes of red and/or blue light detected prior to compressing the data. This can convert the red and/or blue image data into a more compressible form. For example, in the known processes for converting gamma corrected RGB data to Y'CbCr, the image is "decorrelated", leaving most of the image data in the Y' (a.k.a. "luma"), and as such, the remaining chroma components are more compressible. However, the known techniques for converting to the Y'CbCr format cannot be applied directly to Bayer pattern data because the individual color data is not spatially correlated and Bayer pattern data includes twice as much green image data as blue or red image data. The processes of green image data subtraction, in accordance with some of the embodiments disclosed herein, can be similar to the Y'CbCr conversion noted above in that most of the image data is left in the green image data, leaving the remaining data in a more compressible form.

Further, the process of green image data subtraction can be reversed, preserving all the original raw data. Thus, the resulting system and method incorporating such a technique can provide lossless or visually lossless and enhanced compressibility of such video image data.

Thus, in accordance with an embodiment, a video camera can comprise a lens assembly supported by the housing and configured to focus light and a light sensitive device configured to convert the focused light into a raw signal of image data representing at least first, second, and third colors of the focused light. An image processing module can be configured to modify image data of at least one of the first and second colors based on the image data of the third color. Additionally, the video camera can include a memory device and a compression device configured to compress the image data of the first, second, and third colors and to store the compressed image data on the memory device.

In accordance with another embodiment, a method of processing an image can be provided. The method can include converting an image and into first image data representing a first color, second image data representing a second color, and third image data representing a third color, modifying at least the first image data and the second image data based on the third image data, compressing the third image data and the modified first and second image data, and storing the compressed data.

In accordance with yet another embodiment, a video camera can comprise a lens assembly supported by the housing and configured to focus light. A light sensitive device can be configured to convert the focused light into a raw signal of image data representing at least first, second, and third colors of the focused light. The camera can also include means for modifying image data of at least one of the first and second colors based on the image data of the third color, a memory device, and a compression device configured to compress the image data of the first, second, and third colors and to store the compressed image data on the memory device.

BRIEF DESCRIPTION OF THE DRAWINGS

FIG. 3 is a schematic layout of an image sensor having a Bayer Pattern Filter that can be used with the system illustrated in FIG. 1.

FIG. 5 is a schematic layout of the green image data from the green sensor cells of the image sensor of FIG. 3.

FIG. 6 is a schematic layout of the remaining green image data of FIG. 5 after an optional process of deleting some of the original green image data.

FIG. 7 is a schematic layout of the red, blue, and green image data of FIG. 5 organized for processing in the image processing module of FIG. 1.

FIG. 9 is a schematic layout of blue image data resulting from an image transformation process of FIG. 8.

FIG. 10 is a schematic layout of red image data resulting from an image transformation process of FIG. 8.

FIG. 13 is a schematic layout of green image data having been decompressed and demosaiced according to the flowchart of FIG. 12.

FIG. 14 is a schematic layout of half of the original green image data from FIG. 13, having been decompressed and demosaiced according to the flowchart of FIG. 12.

FIG. 15 is a schematic layout of blue image data having been decompressed according to the flowchart of FIG. 12.

FIG. 16 is a schematic layout of blue image data of FIG. 15 having been demosaiced according to the flowchart of FIG. 12.

FIGS. 18B-18C are schematic layouts of blue, red, and green image data that can be used in a thresholded median denoising routine performed by exemplary components of the system in FIG. 1.

FIGS. 19B-19C are schematic layouts of blue, red, and green image data that can be used in spatial and temporal denoising routines performed by exemplary components of the system in FIG. 1.

DETAILED DESCRIPTION OF EMBODIMENTS

Figure 1:
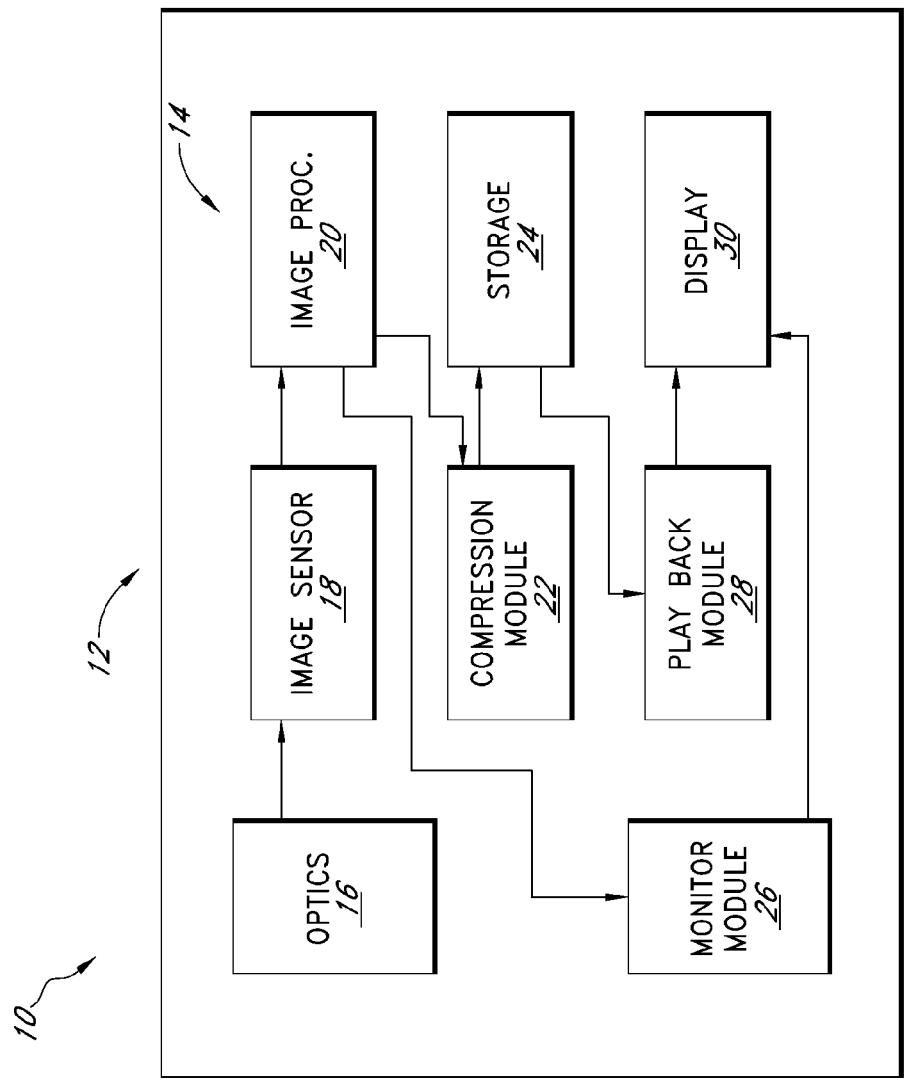
FIG. 1 is a block diagram illustrating a system that can include hardware and/or can be configured to perform methods for processing video image data in accordance with an embodiment.

FIG. 1 is a schematic diagram of a camera having image sensing, processing, and compression modules, described in the context of a video camera for moving pictures. The embodiments disclosed herein are described in the context of a video camera having a single sensor device with a Bayer pattern filter because these embodiments have particular utility in this context. However, the embodiments and inventions herein can also be applied to cameras having other types of image sensors (e.g., CMY Bayer as well as other non-Bayer patterns), other numbers of image sensors, operating on different image format types, and being configured for still and/or moving pictures. Thus, it is to be understood that the embodiments disclosed herein are exemplary but nonlimiting embodiments, and thus, the inventions disclosed herein are not limited to the disclosed exemplary embodiments.

With continued reference to FIG. 1, a camera 10 can include a body or housing 12 configured to support a system 14 configured to detect, process, and optionally store and/or replay video image data. For example, the system 14 can include optics hardware 16, an image sensor 18, an image processing module 20, a compression module 22, and a storage device 24. Optionally, the camera 10 can also include a monitor module 26, a playback module 28, and a display 30.

Figure 2:
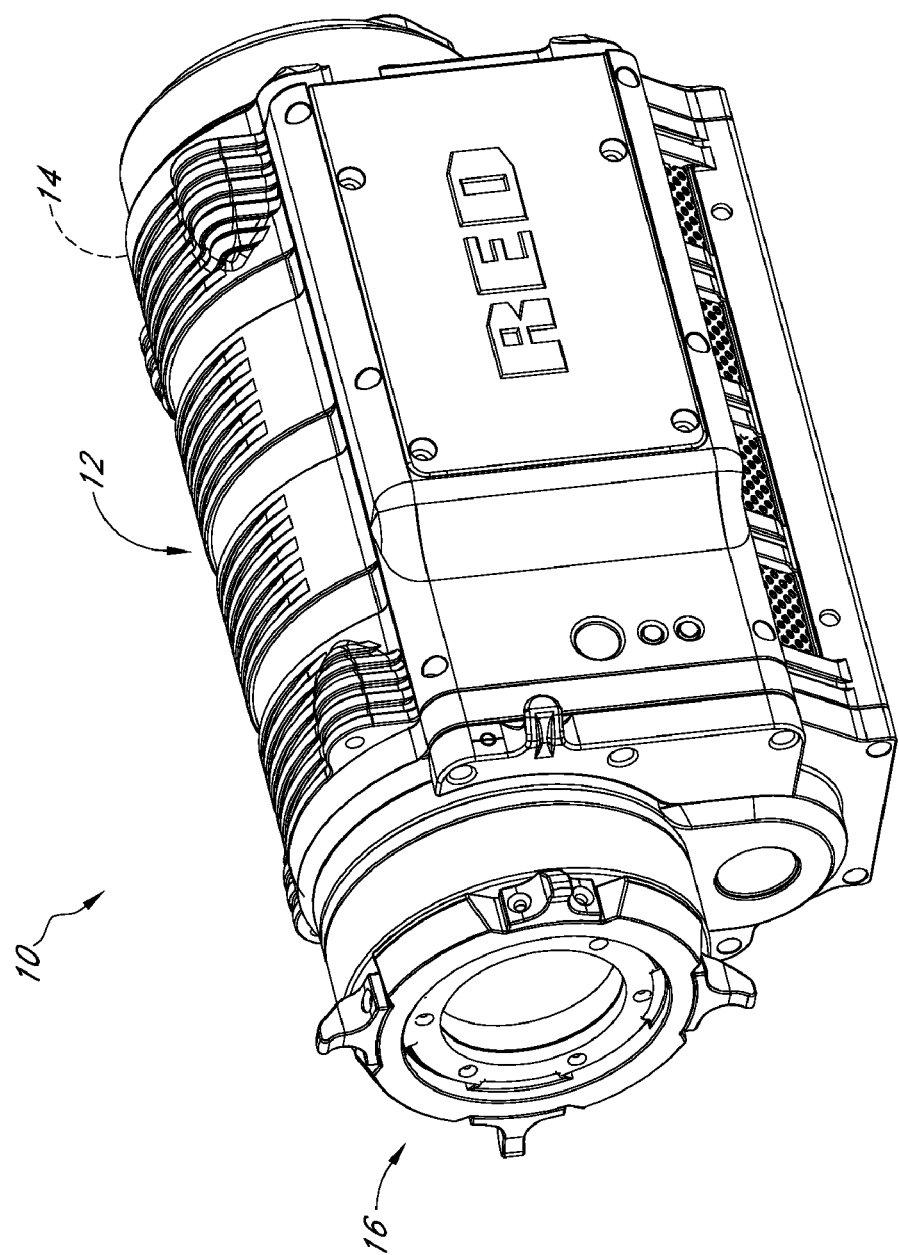
FIG. 2 is an optional embodiment of a housing for the camera schematically illustrated in FIG. 1.

FIG. 2 illustrates a nonlimiting exemplary embodiment of the camera 10. As shown in FIG. 2, the optics hardware 16 can be supported by the housing 12 in a manner that leaves it exposed at its outer surface. In some embodiments, the system 14 is supported within the housing 12. For example, the image sensor 18, image processing module 20, and the compression module 22 can be housed within the housing 12. The storage device 24 can be mounted in the housing 12. Additionally, in some embodiments, the storage device 24 can be mounted to an exterior of the housing 12 and connected to the remaining portions of the system 14 through any type of known connector or cable. Additionally, the storage device 24 can be connected to the housing 12 with a flexible cable, thus allowing the storage device 24 to be moved somewhat independently from the housing 12. For example, with such a flexible cable connection, the storage device 24 can be worn on a belt of a user, allowing the total weight of the housing 12 to be reduced. Further, in some embodiments, the housing can include one or more storage devices 24 inside and mounted to its exterior. Additionally, the housing 12 can also support the monitor module 26, and playbook module 28. Additionally, in some embodiments, the display 30 can be configured to be mounted to an exterior of the housing 12.

The optics hardware 16 can be in the form of a lens system having at least one lens configured to focus an incoming image onto the image sensor 18. The optics hardware 16, optionally, can be in the form of a multi-lens system providing variable zoom, aperture, and focus. Additionally, the optics hardware 16 can be in the form of a lens socket supported by the housing 12 and configured to receive a plurality of different types of lens systems for example, but without limitation, the optics hardware 16 include a socket configured to receive various sizes of lens systems including a 50-100 millimeter (F2.8) zoom lens, an 18-50 millimeter (F2.8) zoom lens, a 300 millimeter (F2.8) lens, 15 millimeter (F2.8) lens, 25 millimeter (F1.9) lens, 35 millimeter (F1.9) lens, 50 millimeter (F1.9) lens, 85 millimeter (F1.9) lens, and/or any other lens. As noted above, the optics hardware 16 can be configured such that despite which lens is attached thereto, images can be focused upon a light-sensitive surface of the image sensor 18.

The image sensor 18 can be any type of video sensing device, including, for example, but without limitation, CCD, CMOS, vertically-stacked CMOS devices such as the Foveon® sensor, or a multi-sensor array using a prism to divide light between the sensors. In some embodiments, the image sensor 18 can include a CMOS device having about 12 million photocells. However, other size sensors can also be used. In some configurations, camera 10 can be configured to output video at "2k" (e.g., 2048×1152 pixels), "4k" (e.g., 4,096×2,540 pixels), "4.5 k" horizontal resolution or greater resolutions. As used herein, in the terms expressed in the format of xk (such as 2k and 4k noted above), the "x" quantity refers to the approximate horizontal resolution. As such, "4k" resolution corresponds to about 4000 or more horizontal pixels and "2k" corresponds to about 2000 or more pixels. Using currently commercially available hardware, the sensor can be as small as about 0.5 inches (8 mm), but it can be about 1.0 inches, or larger. Additionally, the image sensor 18 can be configured to provide variable resolution by selectively outputting only a predetermined portion of the sensor 18. For example, the sensor 18 and/or the image processing module can be configured to allow a user to identify the resolution of the image data output.

The camera 10 can also be configured to downsample and subsequently process the output of the sensor 18 to yield video output at 2K, 1080p, 720p, or any other resolution. For example, the image data from the sensor 18 can be "windowed", thereby reducing the size of the output image and allowing for higher readout speeds. However, other size sensors can also be used. Additionally, the camera 10 can be configured to upsample the output of the sensor 18 to yield video output at higher resolutions.

With reference to FIGS. 1 and 3, in some embodiments, the sensor 18 can include a Bayer pattern filter. As such, the sensor 18, by way of its chipset (not shown) outputs data representing magnitudes of red, green, or blue light detected by individual photocells of the image sensor 18. FIG. 3 schematically illustrates the Bayer pattern output of the sensor 18. In some embodiments, for example, as shown in FIG. 3, the Bayer pattern filter has twice as many green elements as the number of red elements and the number of blue elements. The chipset of the image sensor 18 can be used to read the charge on each element of the image sensor and thus output a stream of values in the well-known RGB format output.

Figure 4:
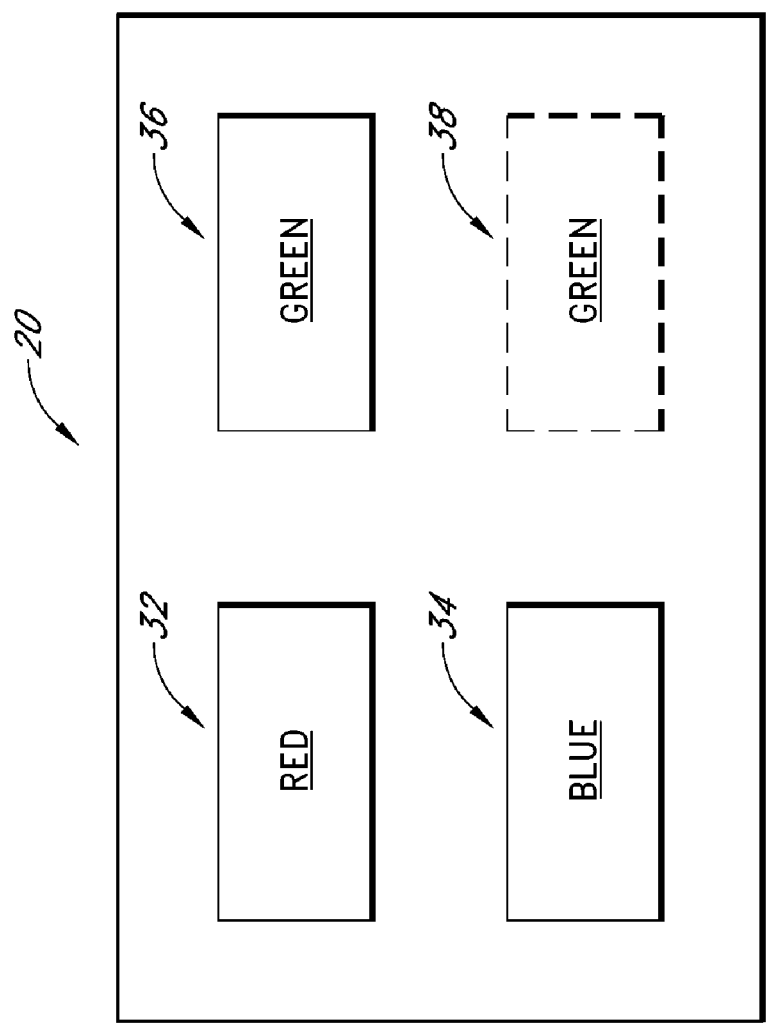
FIG. 4 is a schematic block diagram of an image processing module that can be used in the system illustrated in FIG. 1.

With continued reference to FIG. 4, the image processing module 20 optionally can be configured to format the data stream from the image sensor 18 in any known manner. In some embodiments, the image processing module 20 can be configured to separate the green, red, and blue image data into three or four separate data compilations. For example, the image processing module 20 can be configured to separate the red data into one data element, the blue data into one blue data element, and the green data into one green data element. For example, with reference to FIG. 4, the image processing module 20 can include a red data processing module 32, a blue data image processing module 34, and a first green image data processing module 36.

As noted above, however, the Bayer pattern data illustrated in FIG. 3, has twice as many green pixels as the other two colors. FIG. 5 illustrates a data component with the blue and red data removed, leaving only the original green image data.

Figure 6:
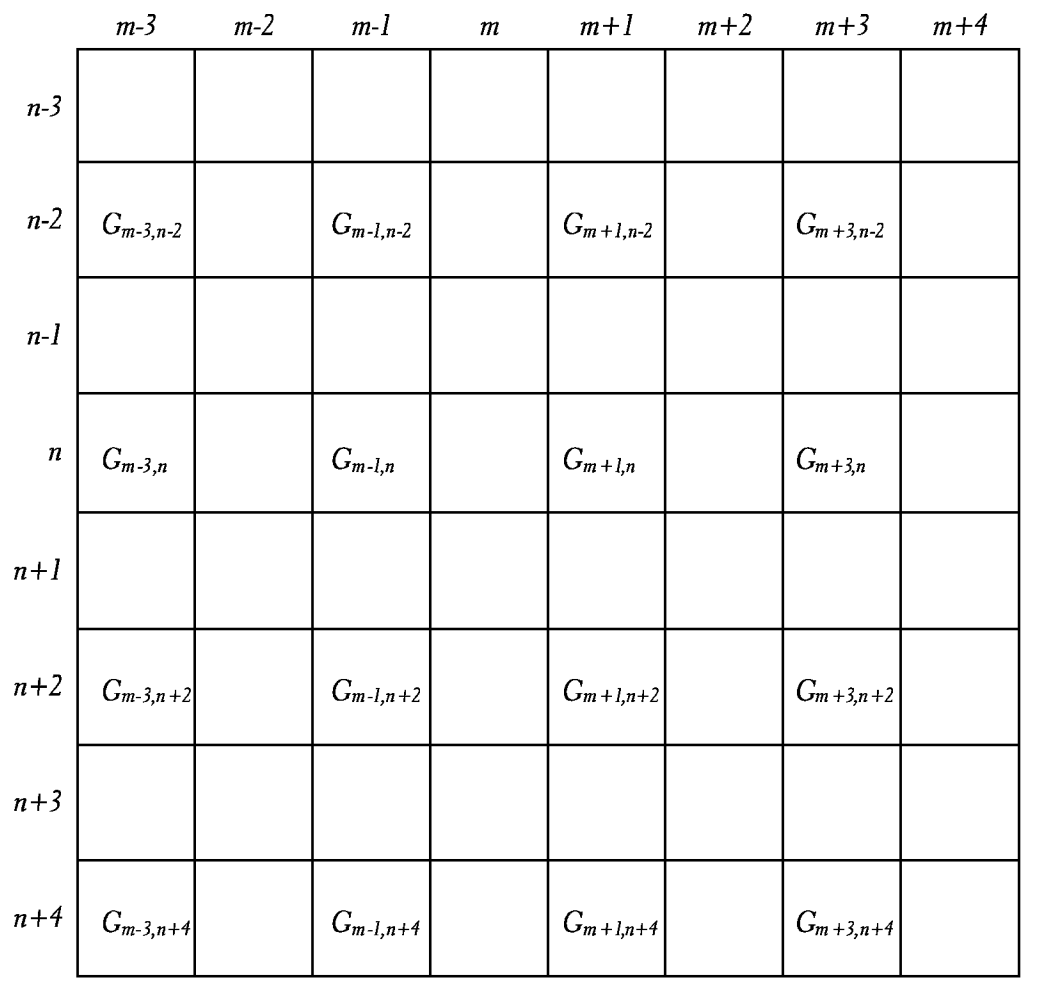

In some embodiments, the camera 10 can be configured to delete or omit some of the green image data. For example, in some embodiments, the image processing module 20 can be configured to delete ½ of the green image data so that the total amount of green image data is the same as the amounts of blue and red image data. For example, FIG. 6 illustrates the remaining data after the image processing module 20 deletes ½ of the green image data. In the illustrated embodiment of FIG. 6, the rows n−3, n−1, n+1, and n+3 have been deleted. This is merely one example of the pattern of green image data that can be deleted. Other patterns and other amounts of green image data can also be deleted.

In some alternatives, the camera 10 can be configured to delete ½ of the green image data after the red and blue image data has been transformed based on the green image data. This optional technique is described below following the description of the subtraction of green image data values from the other color image data.

Optionally, the image processing module 20 can be configured to selectively delete green image data. For example, the image processing module 20 can include a deletion analysis module (not shown) configured to selectively determine which green image data to delete. For example, such a deletion module can be configured to determine if deleting a pattern of rows from the green image data would result in aliasing artifacts, such as Moiré lines, or other visually perceptible artifacts. The deletion module can be further configured to choose a pattern of green image data to delete that would present less risk of creating such artifacts. For example, the deletion module can be configured to choose a green image data deletion pattern of alternating vertical columns if it determines that the image captured by the image sensor 18 includes an image feature characterized by a plurality of parallel horizontal lines. This deletion pattern can reduce or eliminate artifacts, such as Moiré lines, that might have resulted from a deletion pattern of alternating lines of image data parallel to the horizontal lines detected in the image.

However, this merely one exemplary, non-limiting example of the types of image features and deletion patterns that can be used by the deletion module. The deletion module can also be configured to detect other image features and to use other image data deletion patterns, such as for example, but without limitation, deletion of alternating rows, alternating diagonal lines, or other patterns. Additionally, the deletion module can be configured to delete portions of the other image data, such as the red and blue image data, or other image data depending on the type of sensor used.

Additionally, the camera 10 can be configured to insert a data field into the image data indicating what image data has been deleted. For example, but without limitation, the camera 10 can be configured to insert a data field into the beginning of any video clip stored into the storage device 24, indicating what data has been deleted in each of the "frames" of the video clip. In some embodiments, the camera can be configured to insert a data field into each frame captured by the sensor 18, indicating what image data has been deleted. For example, in some embodiments, where the image processing module 20 is configured to delete ½ of the green image data in one deletion pattern, the data field can be as small as a single bit data field, indicating whether or not image data has been deleted. Since the image processing module 20 is configured to delete data in only one pattern, a single bit is sufficient to indicate what data has been deleted.

In some embodiments, as noted above, the image processing module 20 can be configured to selectively delete image data in more than one pattern. Thus, the image data deletion field can be larger, including a sufficient number of values to provide an indication of which of the plurality of different image data deletion patterns was used. This data field can be used by downstream components and or processes to determine to which spatial positions the remaining image data corresponds.

In some embodiments, the image processing module can be configured to retain all of the raw green image data, e.g., the data shown in FIG. 5. In such embodiments, the image processing module can include one or more green image data processing modules.

As noted above, in known Bayer pattern filters, there are twice as many green elements as the number of red elements and the number of blue elements. In other words, the red elements comprise 25% of the total Bayer pattern array, the blue elements corresponded 25% of the Bayer pattern array and the green elements comprise 50% of the elements of the Bayer pattern array. Thus, in some embodiments, where all of the green image data is retained, the image processing module 20 can include a second green data image processing module 38. As such, the first green data image processing module 36 can process half of the green elements and the second green image data processing module 38 can process the remaining green elements. However, the present inventions can be used in conjunction with other types of patterns, such as for example, but without limitation, CMY and RGBW.

FIG. 7 includes schematic illustrations of the red, blue and two green data components processed by modules 32, 34, 36, and 38 (FIG. 4). This can provide further advantages because the size and configuration of each of these modules can be about the same since they are handling about the same amount of data. Additionally, the image processing module 20 can be selectively switched between modes in which is processes all of the green image data (by using both modules 36 and 38) and modes where ½ of the green image data is deleted (in which it utilizes only one of modules 36 and 38). However, other configurations can also be used.

Additionally, in some embodiments, the image processing module 20 can include other modules and/or can be configured to perform other processes, such as, for example, but without limitation, gamma correction processes, noise filtering processes, etc.

Additionally, in some embodiments, the image processing module 20 can be configured to subtract a value of a green element from a value of a blue element and/or red element. As such, in some embodiments, when certain colors are detected by the image sensor 18, the corresponding red or blue element can be reduced to zero. For example, in many photographs, there can be large areas of black, white, or gray, or a color shifted from gray toward the red or blue colors. Thus, if the corresponding pixels of the image sensor 18 have sensed an area of gray, the magnitude of the green, red, and blue, would be about equal. Thus, if the green value is subtracted from the red and blue values, the red and blue values will drop to zero or near zero. Thus, in a subsequent compression process, there will be more zeros generated in pixels that sense a black, white, or gray area and thus the resulting data will be more compressible. Additionally, the subtraction of green from one or both of the other colors can make the resulting image data more compressible for other reasons.

Such a technique can help achieve a higher effective compression ratio and yet remain visually lossless due to its relationship to the entropy of the original image data. For example, the entropy of an image is related to the amount of randomness in the image. The subtraction of image data of one color, for example, from image data of the other colors can reduce the randomness, and thus reduce the entropy of the image data of those colors, thereby allowing the data to be compressed at higher compression ratios with less loss. Typically, an image is not a collection of random color values. Rather, there is often a certain degree of correlation between surrounding picture elements. Thus, such a subtraction technique can use the correlation of picture elements to achieve better compression. The amount of compression will depend, at least in part, on the entropy of the original information in the image.

In some embodiments, the magnitudes subtracted from a red or blue pixel can be the magnitude of the value output from a green pixel adjacent to the subject red or blue pixel. Further, in some embodiments, the green magnitude subtracted from the red or blue elements can be derived from an average of the surrounding green elements. Such techniques are described in greater detail below. However, other techniques can also be used.

Optionally, the image processing module 20 can also be configured to selectively subtract green image data from the other colors. For example, the image processing module 20 can be configured to determine if subtracting green image data from a portion of the image data of either of the other colors would provide better compressibility or not. In this mode, the image processing module 20 can be configured to insert flags into the image data indicating what portions of the image data has been modified (by e.g., green image data subtraction) and which portions have not been so modified. With such flags, a downstream demosaicing/reconstruction component can selectively add green image values back into the image data of the other colors, based on the status of such data flags.

Optionally, image processing module 20 can also include a further data reduction module (not shown) configured to round values of the red and blue data. For example, if, after the subtraction of green magnitudes, the red or blue data is near zero (e.g., within one or two on an 8-bit scale ranging from 0-255 or higher magnitudes for a higher resolution system). For example, the sensor 18 can be a 12-bit sensor outputting red, blue, and green data on a scale of 0-4095. Any rounding or filtering of the data performed the rounding module can be adjusted to achieve the desired effect. For example, rounding can be performed to a lesser extent if it is desired to have lossless output and to a greater extent if some loss or lossy output is acceptable. Some rounding can be performed and still result in a visually lossless output. For example, on a 8-bit scale, red or blue data having absolute value of up to 2 or 3 can be rounded to 0 and still provide a visually lossless output. Additionally, on a 12-bit scale, red or blue data having an absolute value of up to 10 to 20 can be rounded to 0 and still provide visually lossless output.

Additionally, the magnitudes of values that can be rounded to zero, or rounded to other values, and still provide a visually lossless output depends on the configuration of the system, including the optics hardware 16, the image sensor 18, the resolution of the image sensor, the color resolution (bit) of the image sensor 18, the types of filtering, anti-aliasing techniques or other techniques performed by the image processing module 20, the compression techniques performed by the compression module 22, and/or other parameters or characteristics of the camera 10.

As noted above, in some embodiments, the camera 10 can be configured to delete ½ of the green image data after the red and blue image data has been transformed based on the green image data. For example, but without limitation, the processor module 20 can be configured to delete ½ of the green image data after the average of the magnitudes of the surrounding green data values have been subtracted from the red and blue data values. This reduction in the green data can reduce throughput requirements on the associated hardware. Additionally, the remaining green image data can be used to reconstruct the red and blue image data, described in greater detail below with reference to FIGS. 14 and 16.

As noted above, the camera 10 can also include a compression module 22. The compression module 22 can be in the form of a separate chip or it can be implemented with software and another processor. For example, the compression module 22 can be in the form of a commercially available compression chip that performs a compression technique in accordance with the JPEG 2000 standard, or other compression techniques.

The compression module can be configured to perform any type of compression process on the data from the image processing module 20. In some embodiments, the compression module 22 performs a compression technique that takes advantage of the techniques performed by the image processing module 20. For example, as noted above, the image processing module 20 can be configured to reduce the magnitude of the values of the red and blue data by subtracting the magnitudes of green image data, thereby resulting in a greater number of zero values, as well as other effects. Additionally, the image processing module 20 can perform a manipulation of raw data that uses the entropy of the image data. Thus, the compression technique performed by the compression module 22 can be of a type that benefits from the presence of larger strings of zeros to reduce the size of the compressed data output therefrom.

Further, the compression module 22 can be configured to compress the image data from the image processing module 20 to result in a visually lossless output. For example, firstly, the compression module can be configured to apply any known compression technique, such as, but without limitation, JPEG 2000, MotionJPEG, any DCT based codec, any codec designed for compressing RGB image data, H.264, MPEG4, Huffman, or other techniques.

Depending on the type of compression technique used, the various parameters of the compression technique can be set to provide a visually lossless output. For example, many of the compression techniques noted above can be adjusted to different compression rates, wherein when decompressed, the resulting image is better quality for lower compression rates and lower quality for higher compression rates. Thus, the compression module can be configured to compress the image data in a way that provides a visually lossless output, or can be configured to allow a user to adjust various parameters to obtain a visually lossless output. For example, the compression module 22 can be configured to compress the image data at a compression ratio of about 6:1, 7:1, 8:1 or greater. In some embodiments, the compression module 22 can be configured to compress the image data to a ratio of 12:1 or higher.

Additionally, the compression module 22 can be configured to allow a user to adjust the compression ratio achieved by the compression module 22. For example, the camera 10 can include a user interface that allows a user to input commands that cause the compression module 22 to change the compression ratio. Thus, in some embodiments, the camera 10 can provide for variable compression.

As used herein, the term "visually lossless" is intended to include output that, when compared side by side with original (never compressed) image data on the same display device, one of ordinary skill in the art would not be able to determine which image is the original with a reasonable degree of accuracy, based only on a visual inspection of the images.

With continued reference to FIG. 1, the camera 10 can also include a storage device 24. The storage device can be in the form of any type of digital storage, such as, for example, but without limitation, hard disks, flash memory, or any other type of memory device. In some embodiments, the size of the storage device 24 can be sufficiently large to store image data from the compression module 22 corresponding to at least about 30 minutes of video at 12 mega pixel resolution, 12-bit color resolution, and at 60 frames per second. However, the storage device 24 can have any size.

In some embodiments, the storage device 24 can be mounted on an exterior of the housing 12. Further, in some embodiments, the storage device 24 can be connected to the other components of the system 14 through standard communication ports, including, for example, but without limitation, IEEE 1394, USB 2.0, IDE, SATA, etc. Further, in some embodiments, the storage device 24 can comprise a plurality of hard drives operating under a RAID protocol. However, any type of storage device can be used.

With continued reference to FIG. 1, as noted above, in some embodiments, the system can include a monitor module 26 and a display device 30 configured to allow a user to view video images captured by the image sensor 18 during operation. In some embodiments, the image processing module 20 can include a subsampling system configured to output reduced resolution image data to the monitor module 26. For example, such a subsampling system can be configured to output video image data to support 2K, 1080p, 720p, or any other resolution. In some embodiments, filters used for demosaicing can be adapted to also perform downsampling filtering, such that downsampling and filtering can be performed at the same time. The monitor module 26 can be configured to perform any type of demosaicing process to the data from the image processing module 20. Thereafter, the monitor module 26 can output a demosaiced image data to the display 30.

The display 30 can be any type of monitoring device. For example, but without limitation, the display 30 can be a four-inch LCD panel supported by the housing 12. For example, in some embodiments, the display 30 can be connected to an infinitely adjustable mount configured to allow the display 30 to be adjusted to any position relative to the housing 12 so that a user can view the display 30 at any angle relative to the housing 12. In some embodiments, the display 30 can be connected to the monitor module through any type of video cables such as, for example, an RGB or YCC format video cable.

Optionally, the playback module 28 can be configured to receive data from the storage device 24, decompressed and demosaic the image data and then output the image data to the display 30. In some embodiments, the monitor module 26 and the playback module 28 can be connected to the display through an intermediary display controller (not shown). As such, the display 30 can be connected with a single connector to the display controller. The display controller can be configured to transfer data from either the monitor module 26 or the playback module 28 to the display 30.

Figure 8:
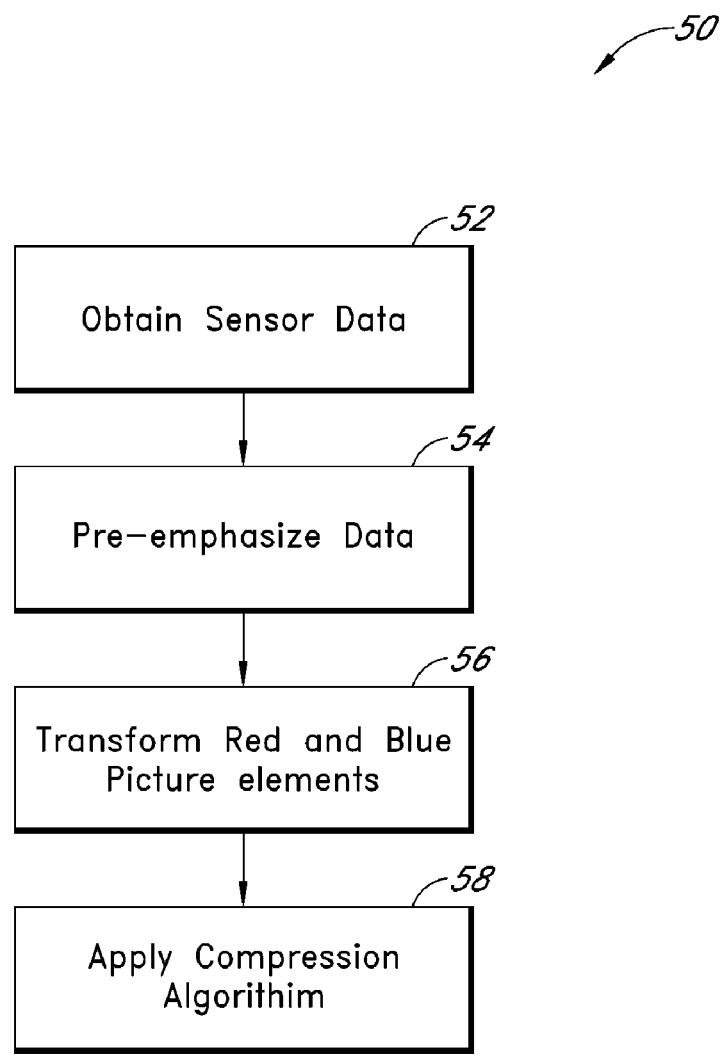
FIG. 8 is a flowchart illustrating an image data transformation technique that can be used with the system illustrated in FIG. 1.

FIG. 8 includes a flowchart 50 illustrating the processing of image data by the camera 10. In some embodiments, the flowchart 50 can represent a control routine stored in a memory device, such as the storage device 24, or another storage device (not shown) within the camera 10. Additionally, a central processing unit (CPU) (not shown) can be configured to execute the control routine. The below description of the methods corresponding to the flow chart 50 are described in the context of the processing of a single frame of video image data. Thus, the techniques can be applied to the processing of a single still image. These processes can also be applied to the processing of continuous video, e.g., frame rates of greater than 12, as well as frame rates of 20, 23.976, 24, 30, 60, and 120, or other frame rates between these frame rates or greater.

With continued reference to FIG. 8, control routine can begin at operation block 52. In the operation block 52, the camera 10 can obtain sensor data. For example, with reference to FIG. 1, the image sensor 18, which can include a Bayer Sensor and chipset, can output image data.

For example, but without limitation, with reference to FIG. 3, the image sensor can comprise a CMOS device having a Bayer pattern filter on its light receiving surface. Thus, the focused image from the optics hardware 16 is focused on the Bayer pattern filter on the CMOS device of the image sensor 18. FIG. 3 illustrates an example of the Bayer pattern created by the arrangement of Bayer pattern filter on the CMOS device.

In FIG. 3, column m is the fourth column from the left edge of the Bayer pattern and row n is the fourth row from the top of the pattern. The remaining columns and rows are labeled relative to column m and row n. However, this layout is merely chosen arbitrarily for purposes of illustration, and does not limit any of the embodiments or inventions disclosed herein.

As noted above, known Bayer pattern filters often include twice as many green elements as blue and red elements. In the pattern of FIG. 5, blue elements only appear in rows n−3, n−1, n+1, and n+3. Red elements only appear in rows n−2, n, n+2, and n+4. However, green elements appear in all rows and columns, interspersed with the red and blue elements.

Thus, in the operation block 52, the red, blue, and green image data output from the image sensor 18 can be received by the image processing module 20 and organized into separate color data components, such as those illustrated in FIG. 7. As shown in FIG. 7, and as described above with reference to FIG. 4, the image processing module 20 can separate the red, blue, and green image data into four separate components. FIG. 7 illustrates two green components (Green 1 and Green 2), a blue component, and a red component. However, this is merely one exemplary way of processing image data from the image sensor 18. Additionally, as noted above, the image processing module 20, optionally, can arbitrarily or selectively delete ½ of the green image data.

After the operation block 52, the flowchart 50 can move on to operation block 54. In the operation block 56, the image data can be further processed. For example, optionally, any one or all of the resulting data (e.g., green 1, green 2, the blue image data from FIG. 9, and the red image data from FIG. 10) can be further processed.

For example, the image data can be pre-emphasized or processed in other ways. In some embodiments, the image data can be processed to be more (mathematically) non-linear. Some compression algorithms benefit from performing such a linearization on the picture elements prior to compression. However, other techniques can also be used. For example, the image data can be processed with a linear curve, which provides essentially no emphasis.

In some embodiments, the operation block 54 can process the image data using curve defined by the function y=x^0.5. In some embodiments, this curve can be used where the image data was, for example but without limitation, floating point data in the normalized 0-1 range. In other embodiments, for example, where the image data is 12-bit data, the image can be processed with the curve y=(x/4095)^0.5. Additionally, the image data can be processed with other curves, such as y=(x+c)^g where $0.01 \leq g \leq 1$ and c is an offset, which can be 0 in some embodiments. Additionally, log curves can also be used. For example, curves in the form y=A*log(B*x+C) where A, B, and C are constants chosen to provide the desired results. Additionally, the above curves and processes can be modified to provide more linear areas in the vicinity of black, similar to those techniques utilized in the well-known Rec709 gamma curve. In applying these processes to the image data, the same processes can be applied to all of the image data, or different processes can be applied to the different colors of image data. However, these are merely exemplary curves that can be used to process the image data, or curves or transforms can also be used. Additionally, these processing techniques can be applied using mathematical functions such as those noted above, or with Look Up Tables (LUTs). Additionally, different processes, techniques, or transforms can be used for different types of image data, different ISO settings used during recording of the image data, temperature (which can affect noise levels), etc.

After the operation block 54, the flowchart 50 can move to an operation block 56. In the operation block 56, the red and blue picture elements can be transformed. For example, as noted above, green image data can be subtracted from each of the blue and red image data components. In some embodiments, a red or blue image data value can be transformed by subtracting a green image data value of at least one of the green picture elements adjacent to the red or blue picture element. In some embodiments, an average value of the data values of a plurality of adjacent green picture elements can be subtracted from the red or blue image data value. For example, but without limitation, average values of 2, 3, 4, or more green image data values can be calculated and subtracted from red or blue picture elements in the vicinity of the green picture elements.

For example, but without limitation, with reference to FIG. 3, the raw output for the red element $R_{m-2,n-2}$ is surrounded by four green picture elements $G_{m-2,n-3}$, $G_{m-1,n-2}$, $G_{m-3,n-2}$, and $G_{m-2,n-1}$. Thus, the red element $R_{m-2,n-2}$ can be transformed by subtracting the average of the values of the surrounding green element as follows:

$$R_{m,n} = R_{m,n} - (G_{m,n-1} + G_{m+1,n} + G_{m,n+1} + G_{m-1,n})/4 \qquad (1)$$

Similarly, the blue elements can be transformed in a similar manner by subtracting the average of the surrounding green elements as follows:

$$B_{m+1,n+1} = B_{m+1,n+1} - (G_{m+1,n} + G_{m+2,n+1} + G_{m+1,n+2} + G_{m,n+1})/4 \qquad (2)$$

Figure 9:
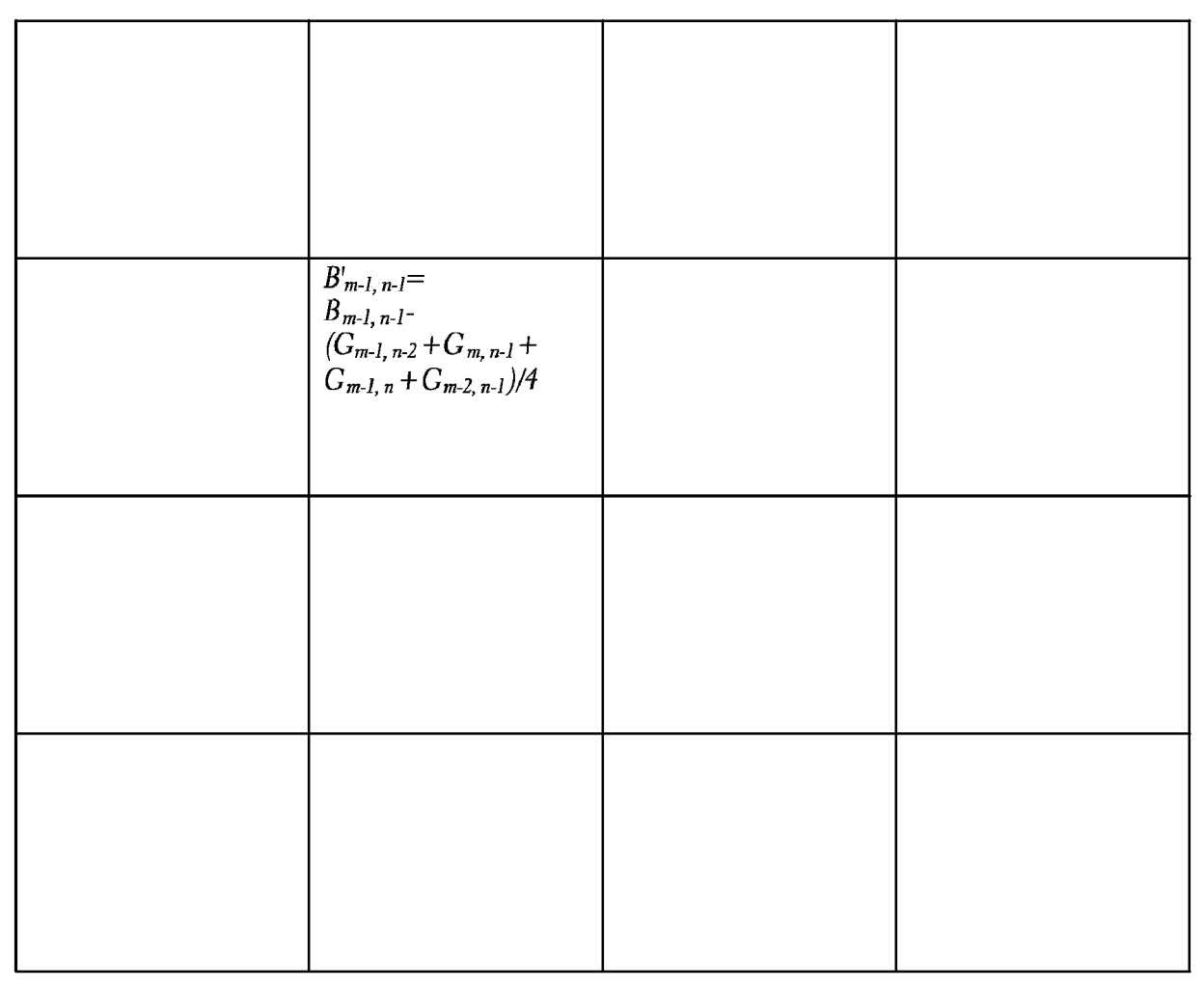
Figure 10:
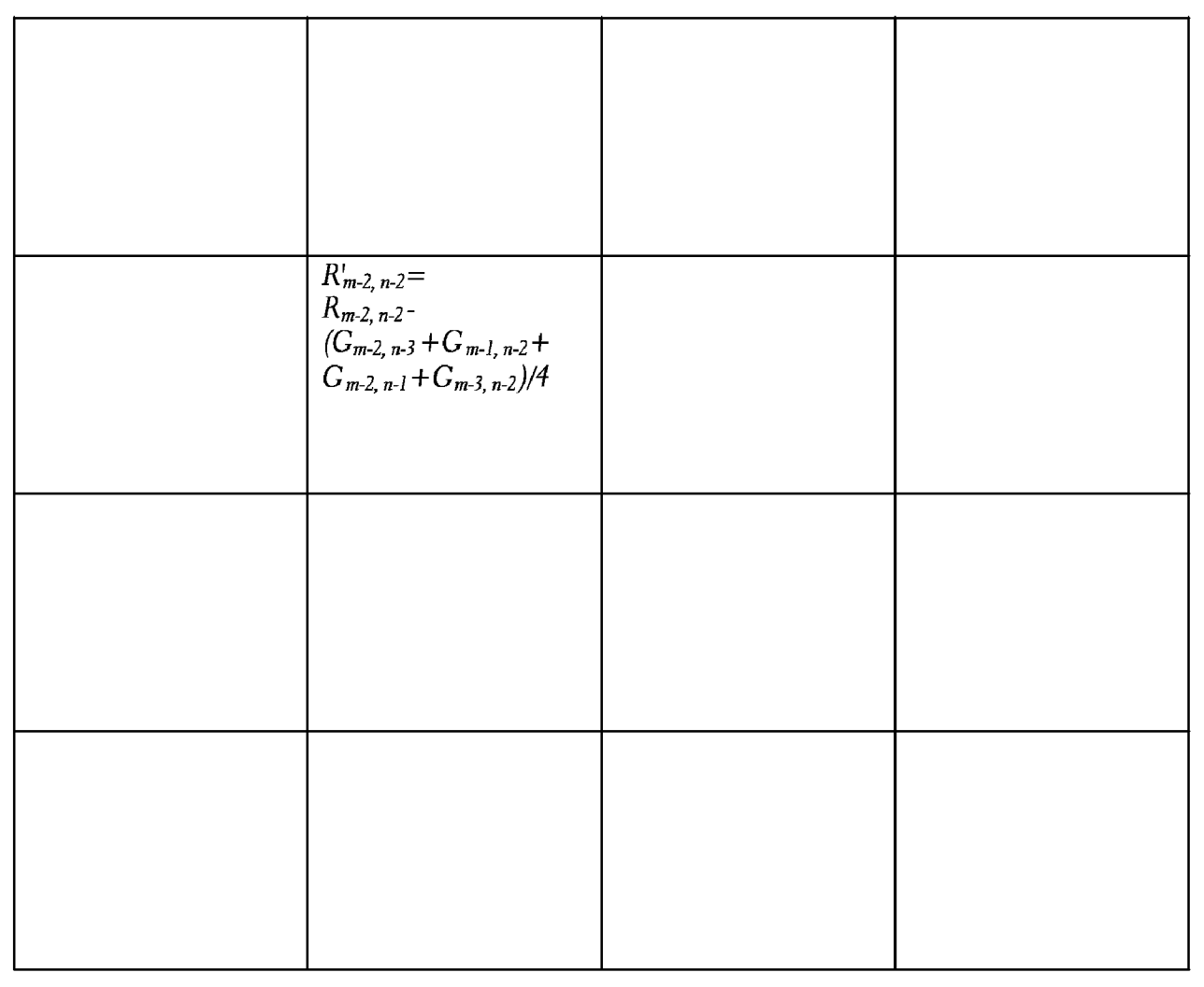

FIG. 9 illustrates a resulting blue data component where the original blue raw data $B_{m-1,n-1}$ is transformed, the new value labeled as $B'_{m-1,n-1}$ (only one value in the component is filled in and the same technique can be used for all the blue elements). Similarly, FIG. 10 illustrates the red data component having been transformed in which the transformed red element $R_{m-2,n-2}$ is identified as $R'_{m-2,n-2}$. In this state, the image data can still be considered "raw" data. For example, the mathematical process performed on the data are entirely reversible such that all of the original values can be obtained by reversing those processes.

With continued reference to FIG. 8, after the operation block 56, the flowchart 50 can move on to an operation block 58. In the operation block 58, the resulting data, which is raw or can be substantially raw, can be further compressed to using any known compression algorithm. For example, the compression module 22 (FIG. 1) can be configured to perform such a compression algorithm. After compression, the compressed raw data can be stored in the storage device 24 (FIG. 1).

Figure 8A:
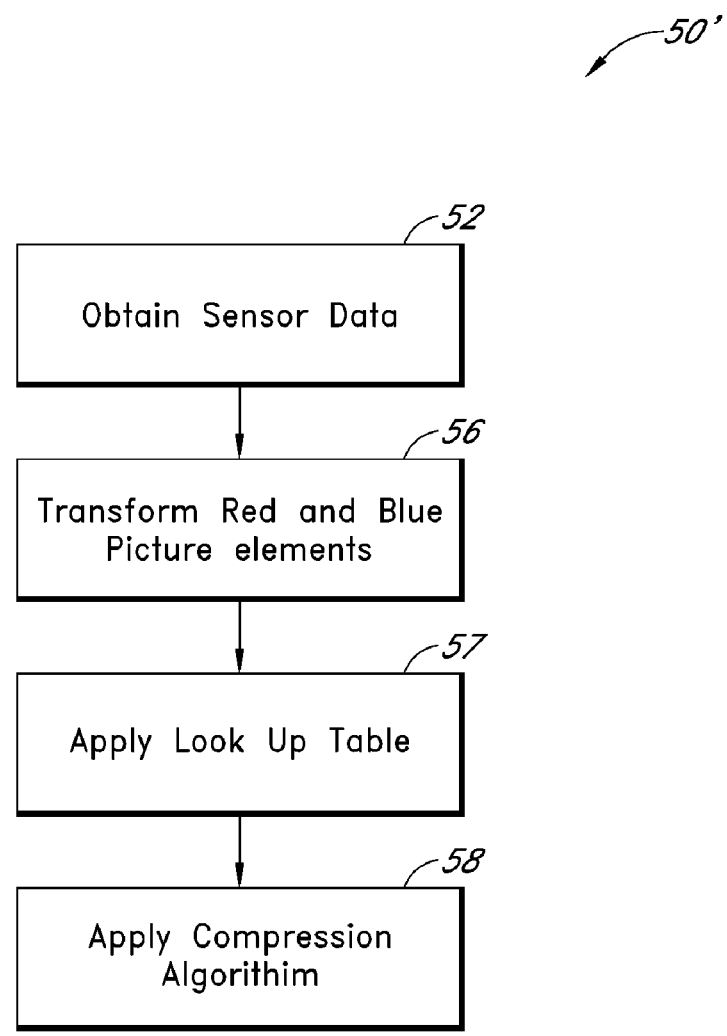
FIG. 8A is a flowchart illustrating a modification of the image data transformation technique of FIG. 8 that can also be used with the system illustrated in FIG. 1.

FIG. 8A illustrates a modification of the flowchart 50, identified by the reference numeral 50'. Some of the steps described above with reference to the flowchart 50 can be similar or the same as some of the corresponding steps of the flowchart 50' and thus are identified with the same reference numerals.

Figure 11:
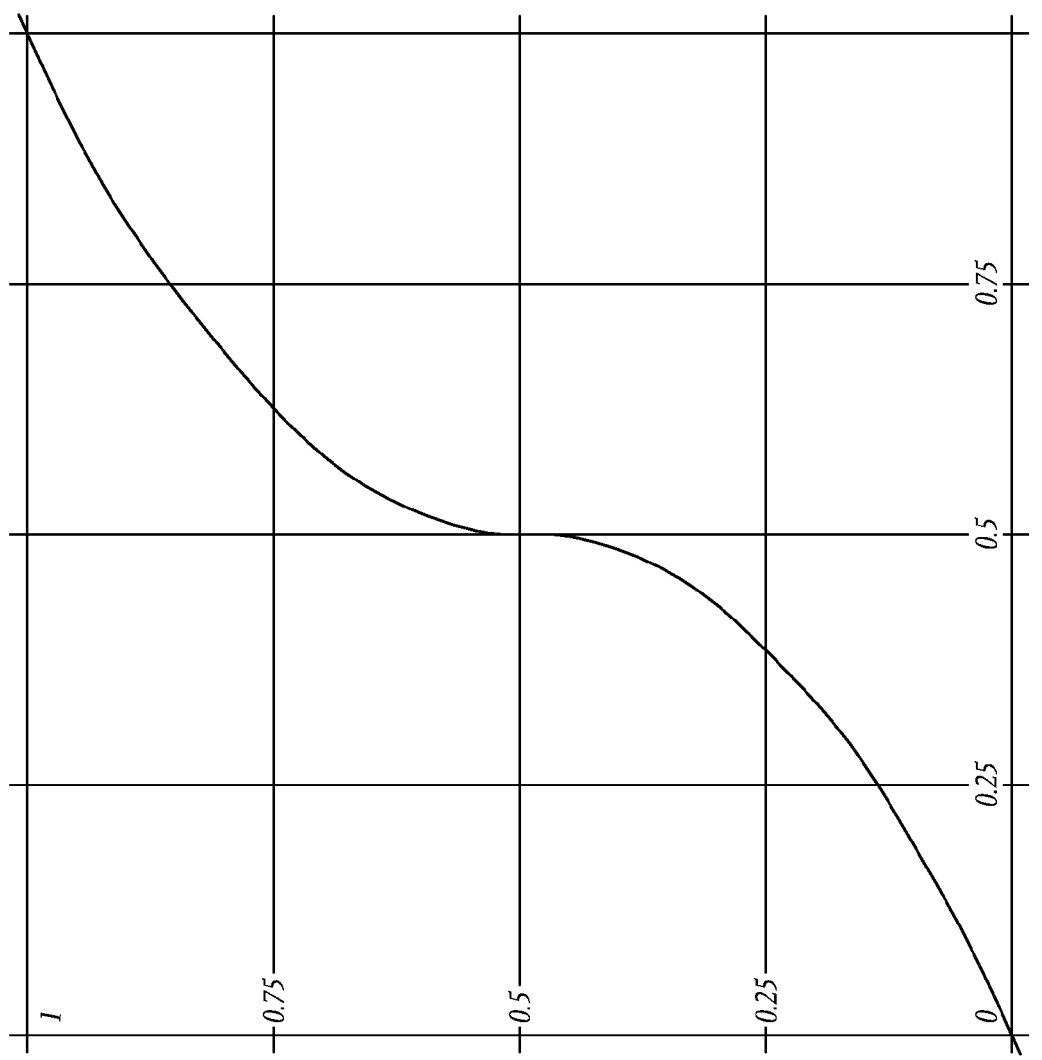
FIG. 11 illustrates an exemplary optional transform that can be applied to the image data for gamma correction.

As shown in FIG. 8A, the flowchart 50', in some embodiments, can optionally omit operation block 54. In some embodiments, the flowchart 50' can also include an operation block 57 in which a look up table can be applied to the image data. For example, an optional look-up table, represented by the curve of FIG. 11, can be used to enhance further compression. In some embodiments, the look-up table of FIG. 11 is only used for the green picture elements. In other embodiments, the look-up table can also be used for red and blue picture elements. The same look-up table may be used for the three different colors, or each color may have its own look-up table. Additionally, processes other than that represented by the curve of FIG. 11 can also be applied.

By processing the image data in the manner described above with reference to FIGS. 8 and 8A, it has been discovered that the image data from the image sensor 18 can be compressed by a compression ratio of 6 to 1 or greater and remain visually lossless. Additionally, although the image data has been transformed (e.g., by the subtraction of green image data) all of the raw image data is still available to an end user. For example, by reversing certain of the processes, all or substantially all of the original raw data can be extracted and thus further processed, filtered, and/or demosaiced using any process the user desires.

Figure 12:
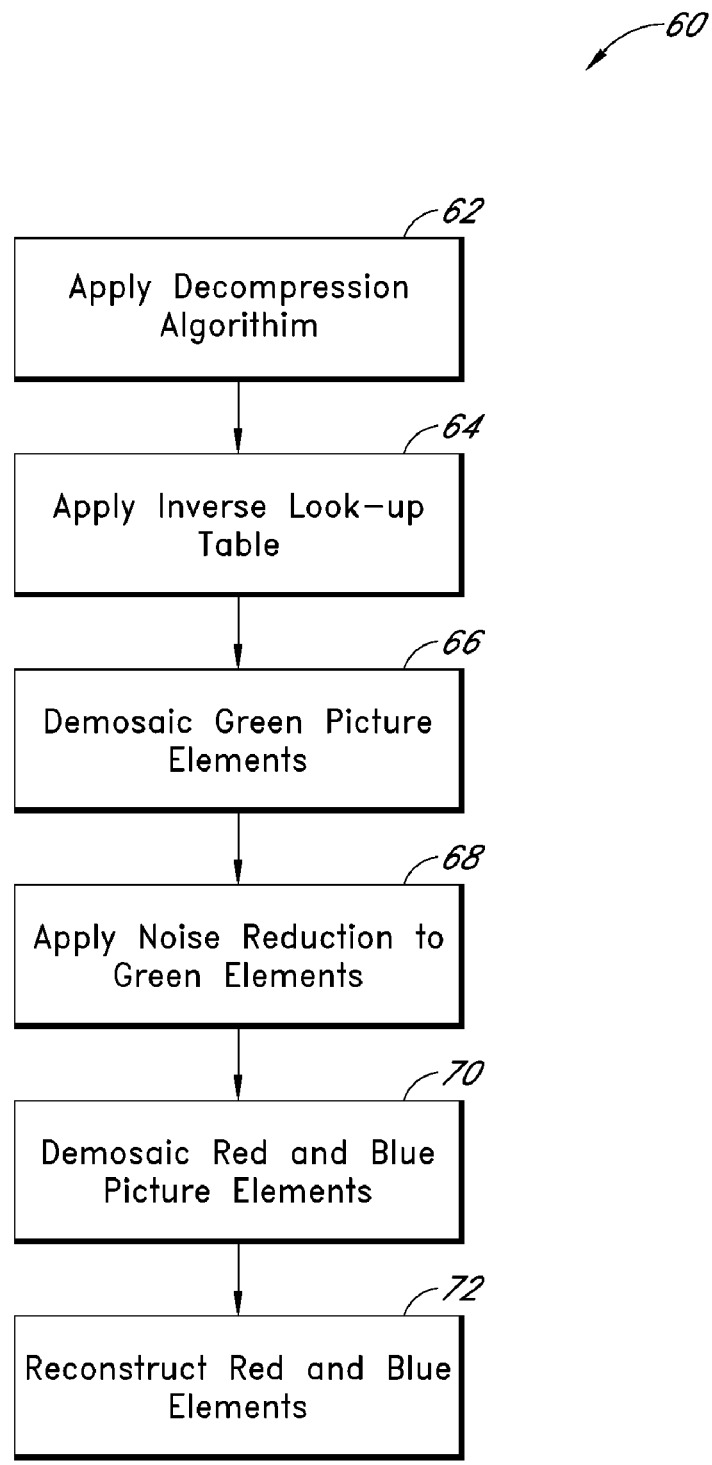
FIG. 12 is a flowchart of a control routine that can be used with the system of FIG. 1 to decompress and demosaic image data.

For example, with reference to FIG. 12, the data stored in the storage device 24 can be decompressed and demosaiced. Optionally, the camera 10 can be configured to perform the method illustrated by flowchart 60. For example, but without limitation, the playback module 28 can be configured to perform the method illustrated by flowchart 60. However, a user can also transfer the data from the storage device 24 into a separate workstation and apply any or all of the steps and/or operations of the flowchart 60.

With continued reference to FIG. 12, the flowchart 60 can begin with the operation block 62, in which the data from the storage device 24 is decompressed. For example, the decompression of the data in operation block 62 can be the reverse of the compression algorithm performed in operational block 58 (FIG. 8). After the operation block 62, the flowchart 60 can move on to an operation block 64.

In the operation block 64, a process performed in operation block 56 (FIG. 8) can be reversed. For example, the inverse of the curve of FIG. 11 or the inverse of any of the other functions described above with reference to operation block 56 of FIGS. 8 and 8A, can be applied to the image data. After the operation block 64, the flowchart 60 can move on to a step 66.

In the operation block 66, the green picture elements can be demosaiced. For example, as noted above, all the values from the data components Green 1 and/or Green 2 (FIG. 7) can be stored in the storage device 24. For example, with reference to FIG. 5, the green image data from the data components Green 1, Green 2 can be arranged according to the original Bayer pattern applied by the image sensor 18. The green data can then be further demosaiced by any known technique, such as, for example, linear interpolation, bilinear, etc.

FIG. 13 illustrates an exemplary layout of green image data demosaiced from all of the raw green image data. The green image elements identified with the letter $G_x$ represent original raw (decompressed) image data and the elements identified with "$DG_x$" represent elements that were derived from the original data through the demosaic process. This nomenclature is used with regard to the below descriptions of the demosaicing process for the other colors. FIG. 14 illustrates an exemplary image data layout for green image data demosaiced from ½ of the original green image data.

With continued reference to FIG. 12, the flowchart 60 can, after the operation block 66, move on to an operation block 68. In the operation block 68, the demosaiced green image data can be further processed. For example, but without limitation, noise reduction techniques can be applied to the green image data. However, any other image processing technique, such as anti-aliasing techniques, can also be applied to the green image data. After the operation block 68, the flowchart 60 can move on to an operation block 70.

In the operation block 70, the red and blue image data can be demosaiced. For example, firstly, the blue image data of FIG. 9 can be rearranged according to the original Bayer pattern (FIG. 15). The surrounding elements, as shown in FIG. 16, can be demosaiced from the existing blue image data using any known demosaicing technique, including linear interpolation, bilinear, etc. As a result of demosaicing step, there will be blue image data for every pixel as shown in FIG. 16. However, this blue image data was demosaiced based on the modified blue image data of FIG. 9, i.e., blue image data values from which green image data values were subtracted.

The operation block 70 can also include a demosaicing process of the red image data. For example, the red image data from FIG. 10 can be rearranged according to the original Bayer pattern and further demosaiced by any known demosaicing process such as linear interpolation, bilinear, etc.

After the operation block 70, the flowchart can move on to an operation block 72. In the operation block 72, the demosaiced red and blue image data can be reconstructed from the demosaiced green image data.

In some embodiments, each of the red and blue image data elements can be reconstructed by adding in the green value from co-sited green image element (the green image element in the same column "m" and row "n" position). For example, after demosaicing, the blue image data includes a blue element value $DB_{m-2,n-2}$. Because the original Bayer pattern of FIG. 3 did not include a blue element at this position, this blue value $DB_{m-2,n-2}$ was derived through the demosaicing process noted above, based on, for example, blue values from any one of the elements $B_{m-3,n-3}$, $B_{m-1,n-3}$, $B_{m-3,n-1}$, and $B_{m-1,n-1}$ or by any other technique or other blue image elements. As noted above, these values were modified in operation block 54 (FIG. 8) and thus do not correspond to the original blue image data detected by the image sensor 18. Rather, an average green value had been subtracted from each of these values. Thus, the resulting blue image data $DB_{m-2,n-2}$ also represents blue data from which green image data has been subtracted. Thus, in one embodiment, the demosaiced green image data for element $DG_{m-2,n-2}$ can be added to the blue image value $DB_{m-2,n-2}$ thereby resulting in a reconstructed blue image data value.

In some embodiments, optionally, the blue and/or red image data can first be reconstructed before demosaicing. For example, the transformed blue image data $B'_{m-1,n-1}$ can be first reconstructed by adding the average value of the surrounding green elements. This would result in obtaining or recalculating the original blue image data $B_{m-1,n-1}$. This process can be performed on all of the blue image data. Subsequently, the blue image data can be further demosaiced by any known demosaicing technique. The red image data can also be processed in the same or similar manners.

Figure 12A:
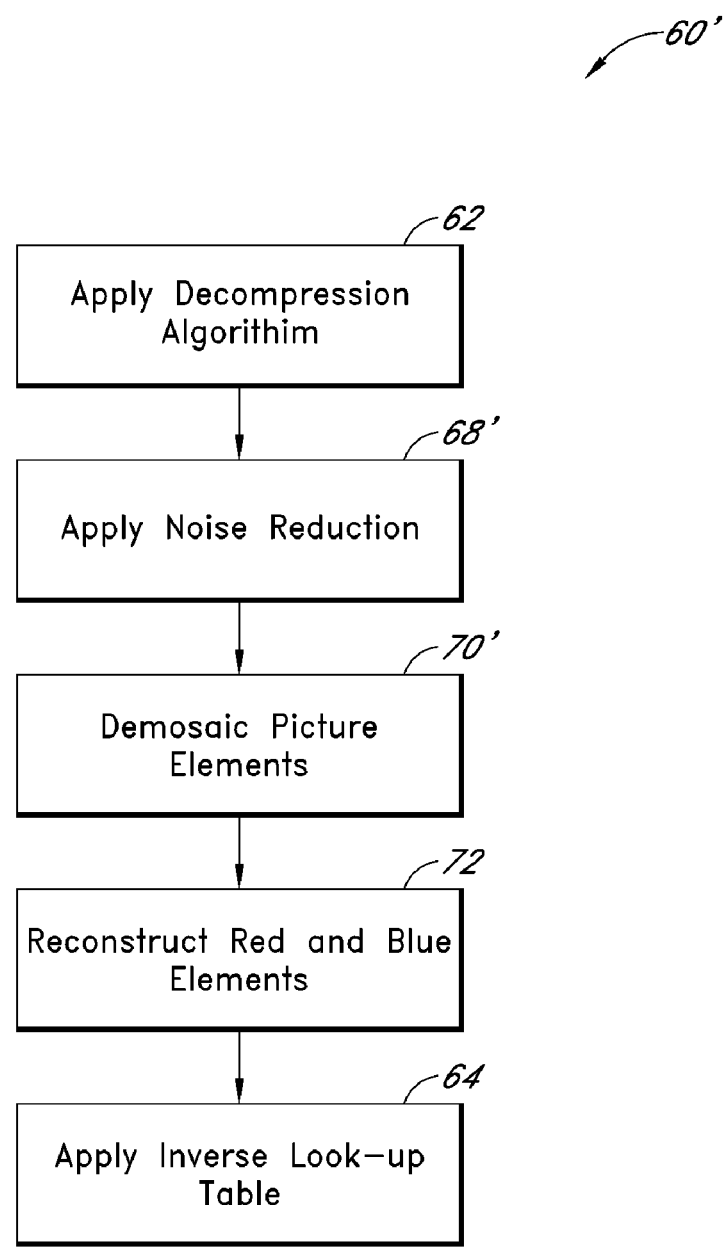
FIG. 12A is a flowchart illustrating a modification of the control routine of FIG. 12 that can also be used with the system illustrated in FIG. 1.

FIG. 12A illustrates a modification of the flowchart 60, identified by the reference numeral 60'. Some of the steps described above with reference to the flowchart 60 can be similar or the same as some of the corresponding steps of the flowchart 60' and thus are identified with the same reference numerals.

As shown in FIG. 12A, the flow chart 60' can include the operation block 68' following operation block 62. In operation block 68', a noise reduction technique can be performed on the image data. For example, but without limitation, noise reduction techniques can be applied to the green image data. However, any other image processing technique, such as anti-aliasing techniques, can also be applied to the green image data. After operation block 68', the flow chart can move on to operation block 70'

In operation block 70', the image data can be demosaiced. In the description set forth above with reference to operation blocks 66 and 70, the green, red, and blue image data can be demosacied in two steps. However, in the present flow chart 60', the demosaicing of all three colors of image data is represented in a single step, although the same demosaicing techniques described above can be used for this demosaicing process. After the operation block 70', the flow chart can move on to operation block 72, in which the red and blue image data can be reconstructed, and operation block 64 in which an inverse look-up table can be applied.

After the image data has been decompressed and processed according to either of the flow charts 70 or 70', or any other suitable process, the image data can be further processed as demosaiced image data.

By demosaicing the green image data before reconstructing the red and blue image data, certain further advantages can be achieved. For example, as noted above, the human eye is more sensitive to green light. Demosiacing and processing the green image data optimize the green image values, to which the human eye is more sensitive. Thus, the subsequent reconstruction of the red and blue image data will be affected by the processing of the green image data.

Additionally, Bayer patterns have twice as many green elements as red and blue elements. Thus, in embodiments where all of the green data is retained, there is twice as much image data for the green elements as compared to either the red or blue image data elements. Thus, the demosaicing techniques, filters, and other image processing techniques result in a better demosaiced, sharpened, or otherwise filtered image. Using these demosaiced values to reconstruct and demosaic the red and blue image data transfers the benefits associated with the higher resolution of the original green data to the process, reconstruction, and demosaicing of the red and blue elements. As such, the resulting image is further enhanced.

Figure 17A:
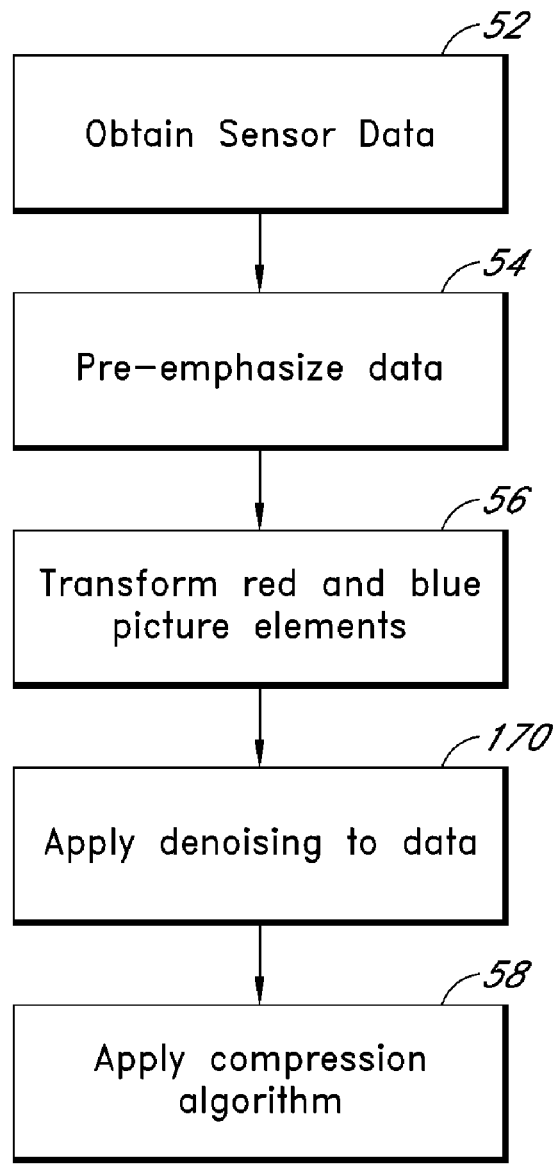
FIGS. 17A-17B are flowcharts illustrating an image data transformation technique which includes noise removal that can be applied in the system illustrated in FIG. 1.
Figure 17B:
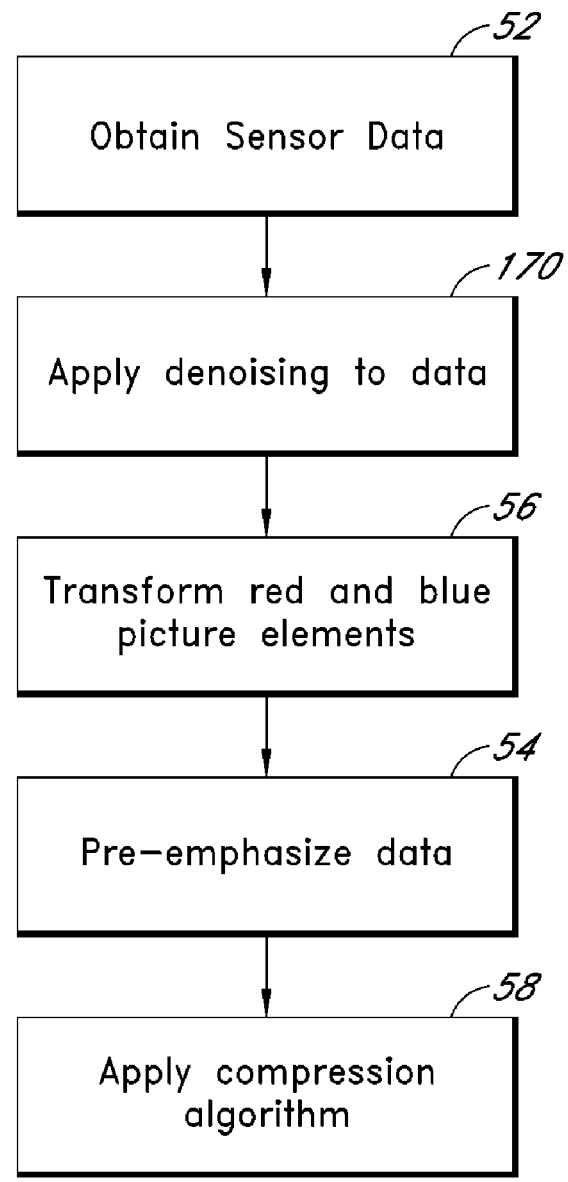

FIGS. 17A-B illustrate a modification of the flowchart 50 of FIG. 8A which includes a stage of noise removal. The exemplary method may be stored as a process accessible by the image processing module 20, compression module 22, and/or other components of the camera 10. Some of the steps described above with reference to the flowchart 50 can be similar or the same as some of the corresponding steps of the flowcharts in FIGS. 17A-17B, and thus are identified with the same reference numerals.

As shown in FIGS. 17A-17B, in some embodiments, operation block 170 can be included in which denoising is applied to the image data. The denoising step can include noise removal techniques, such as spatial denoising where a single image frame is used for noise suppression in a pixel or picture element. Temporal denoising methods that use multiple image frames for noise correction can also be employed, including motion adaptive, semi-motion adaptive, or motion compensative methods. Additionally, other noise removal methods can be used to remove noise from images or a video signal, as described in greater detail below with reference to FIG. 17C and FIGS. 18-20.

In some embodiments, the denoising stage illustrated in operation block 170 can occur before compression in operation block 58. Removing noise from data prior to compression can be advantageous because it can greatly improve the effectiveness of the compression process. In some embodiments, noise removal can be done as part of the compression process in operation block 58.

As illustrated in FIGS. 17A-17B, operation block 170 can occur at numerous points in the image data transformation process. For example, denoising can be applied after step 52 to raw image data from an image sensor prior to transformation; or to Bayer pattern data after the transformation in operation block 56. In some embodiments, denoising can be applied before or after the pre-emphasis of data that occurs in operation block 54. Of note, denoising data before pre-emphasis can be advantageous because denoising can operate more effectively on perceptually linear data. In addition, in exemplary embodiments, green image data can be denoised before operation block 56 to minimize noise during the transformation process of red and blue picture elements in operation block 56.

Figure 17C:
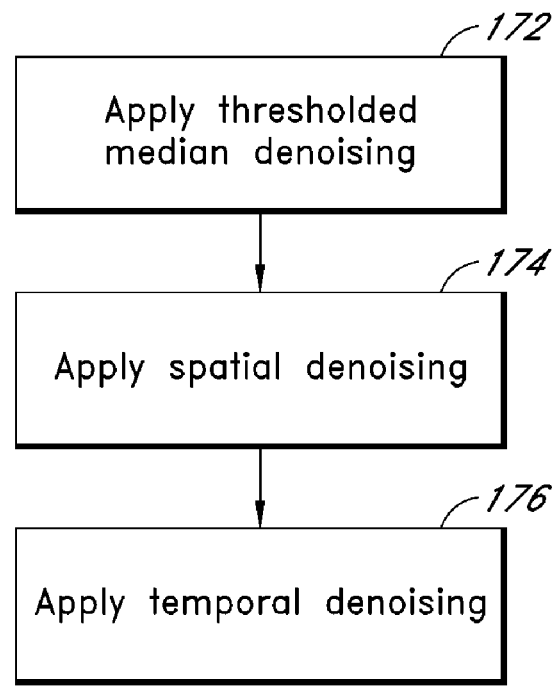
FIG. 17C is a flowchart illustrating noise removal routines performed by exemplary components of the system illustrated in FIG. 1.

FIG. 17C includes a flowchart illustrating the multiple stages of noise removal from image data. In some embodiments, the flowchart can represent a noise removal routine stored in a memory device, such as the storage device 24, or another storage device (not shown) within the camera 10. Additionally, a central processing unit (CPU) (not shown) can be configured to execute the noise removal routine. Depending on the embodiment, certain of the blocks described below may be removed, others may be added, and the sequence of the blocks may be altered.

With continued reference to FIG. 17C, the noise removal routine can begin at operation block 172. In the operation block 172, thresholded median denoising is applied. Thresholded median denoising can include calculating a median (or average) using pixels surrounding or neighboring a current pixel being denoised in an image frame. A threshold value can be used to determine whether or not to replace the current pixel with the median. This can be advantageous for removing spiky noise, such as a pixel that is much brighter or darker than its surrounding pixels. When thresholded median denoising is applied to green picture elements prior to transforming red and blue picture elements based on the green picture elements, noise reduction can be greatly improved.

For example, in one embodiment, the thresholded median denoising may employ a 3×3 median filter that uses a sorting algorithm to smooth artifacts that may be introduced, for example, by defect management algorithms applied and temporal noise. These artifacts are generally manifested as salt-and-pepper noise and the median filter may be useful for removing this kind of noise.

As noted, a threshold can be used in thresholded median denoising to determine whether or not a pixel should be replaced depending on a metric that measures the similarity or difference of a pixel relative to the median value. For example, assuming neighboring green pixels G1 and G2 can be treated as if they are from the same sample. The thresholded median denoising may employ the following algorithm which is expressed in the form of pseudocode for illustrative purposes:

Difference=abs(Gamma(Pixel Value)−Gamma(Median Value))

If (Difference<Threshold), Choose Pixel Value
Else, Choose Median Value

One skilled in the art will recognize that thresholded median denoising may employ other types of algorithms. For example, the threshold value may be a static value that is predetermined or calculated. Alternatively, the threshold value may be dynamically determined and adjusted based on characteristics of a current frame, characteristics of one or more previous frames, etc.

Moving to block 174, spatial denoising is applied to the image data. Spatial denoising can include using picture elements that neighbor a current pixel (e.g. are within spatial proximity) in an image or video frame for noise removal. In some embodiments, a weighting function that weights the surrounding pixels based on their distance from the current pixel, brightness, and the difference in brightness level from the current pixel can be used. This can greatly improve noise reduction in an image frame. Of note, spatial denoising can occur on the transformed red, blue, and green pixels after pre-emphasis in some embodiments.

Continuing to block 176, temporal denoising is applied to the image data. Temporal denoising can include using data from several image or video frames to remove noise from a current frame. For example, a previous frame or a cumulative frame can be used to remove noise from the current frame. The temporal denoising process can, in some embodiments, be used to remove shimmer. In some embodiments, motion adaptive, semi-motion adaptive, and motion compensative methods can be employed that detect pixel motion to determine the correct pixel values from previous frames.

Figure 18A:
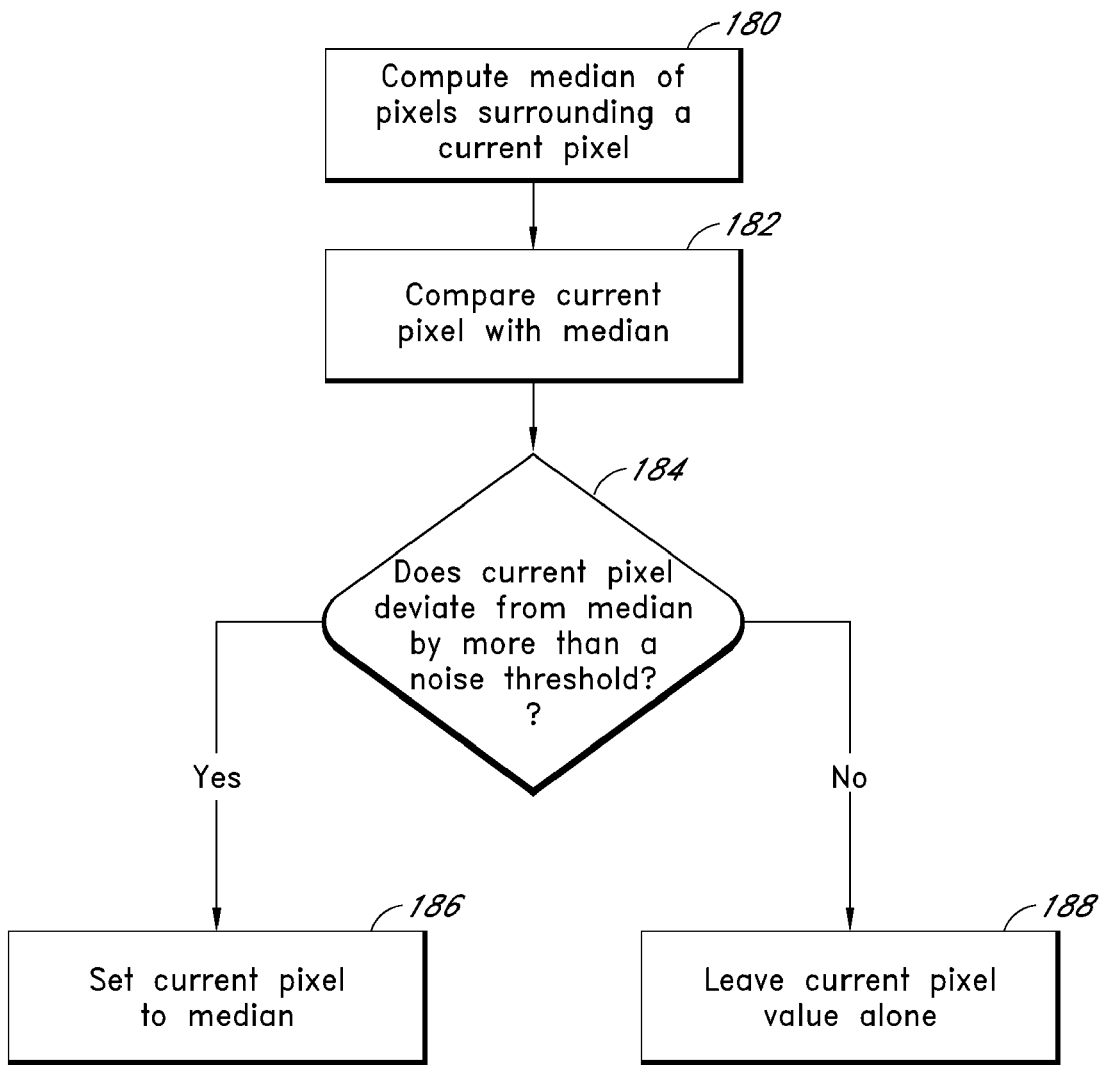
FIG. 18A is a flowchart illustrating a thresholded median denoising routine performed by exemplary components of the system illustrated in FIG. 1.

FIG. 18A illustrates embodiments of a flowchart of an exemplary method of median thresholded denoising. The exemplary method may be stored as a process accessible by the image processing module 150 and/or other components of the camera 10. Depending on the embodiment, certain of the blocks described below may be removed, others may be added, and the sequence of the blocks may be altered.

Figure 18B:
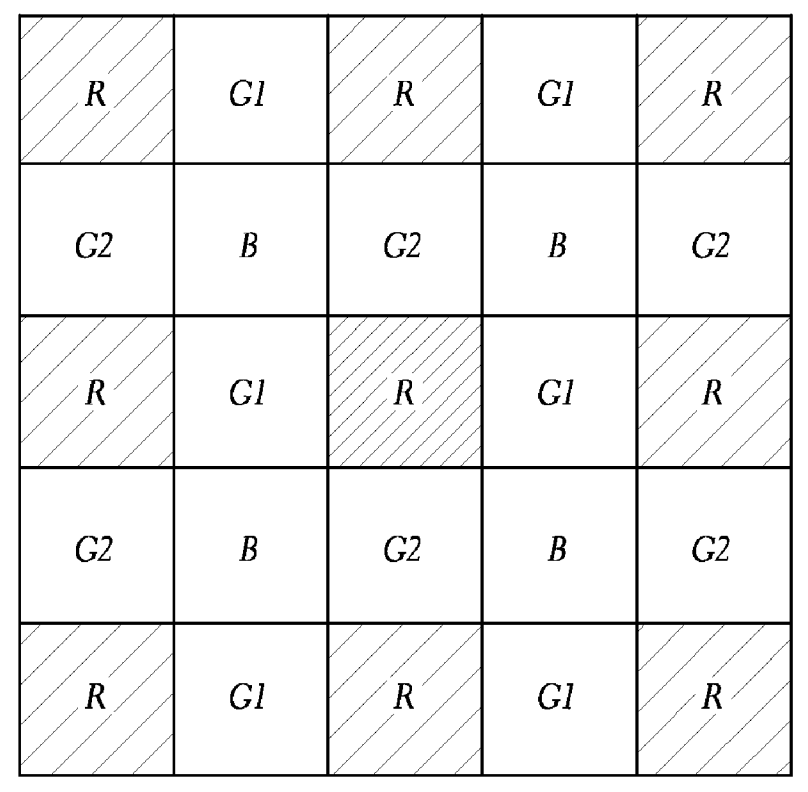

Beginning in block 180, a median (or in some embodiments, an average) of pixels surrounding a current pixel in an image frame is computed. A sample of pixels of various sizes can be selected from the image or video frame to optimize noise reduction, while balancing limitations in the underlying hardware of the camera 10. For example, FIG. 18B shows the sample kernel size for red and blue data pixels, while FIG. 18C shows the sample size for green data pixels. In both FIGS. 18B-18C, the sample size is 9 points for red (R), blue (B), and green (G1 or G2) image data.

Of note, FIG. 18B shows the pattern of pixels used to calculate the median for red and blue pixels. As shown, in FIG. 18B the sample of pixels used for red and blue data maintains a square shape. However, as can be seen in FIG. 18C, the sample of pixels used for green data has a diamond shape. Of note, different sample shapes and sizes can be selected depending on the format of the image data and other constraints.

With continued reference to FIG. 18A, after operation block 180, the flowchart moves on to block 182. In block 182, the value of the current pixel is compared to the median. Moving to block 184, if the current pixel deviates (for example, the absolute difference) from the median by more than a threshold value, then in block 186 the current pixel is replaced with the median value. However, in block 188, if the current pixel does not deviate from the median by more than a threshold value, the current pixel value is left alone.

In some embodiments, the value of the computed median or threshold can vary depending on whether the current pixel being denoised is in a dark or bright region. For example, when the pixel values correspond to linear light sensor data, a weight can be applied to each of the surrounding pixels so that the end result is not skewed based on whether the current pixel is in a bright or dark region. Alternatively, a threshold value can be selected depending on the brightness of the calculated median or current pixel. This can eliminate excessive noise removal from pixels in shadow regions of a frame during the denoising process.

Figure 19A:
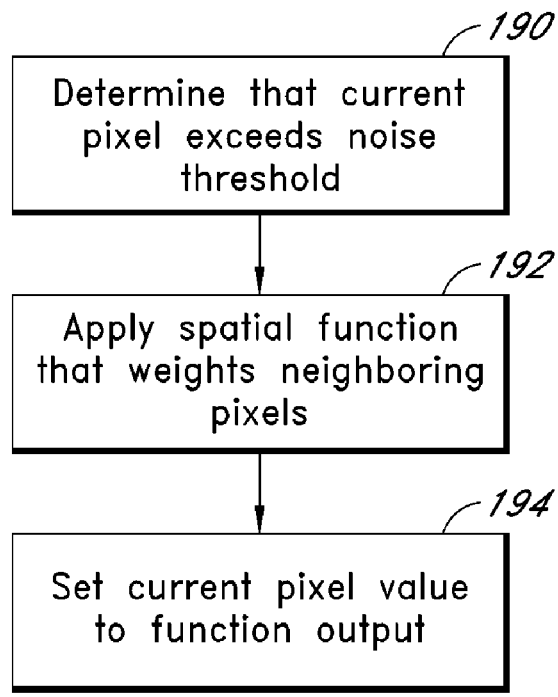
FIG. 19A is a flowchart illustrating a spatial denoising routine performed by exemplary components of the system illustrated in FIG. 1.

FIG. 19A illustrates an exemplary method of spatial noise removal from a frame of image or video data. The exemplary method may be stored as a process accessible by the image processing module 20, compression module 22, and/or other components of the camera 10. Depending on the embodiment, certain of the blocks described below may be removed, others may be added, and the sequence of the blocks may be altered.

Beginning in operation block 190, a current pixel in an image frame are selected and checked against a threshold to determine whether the current pixel exceeds a noise threshold. An artisan will recognize that a variety of techniques can be used to determine whether the current pixel exceeds a noise threshold, including those described with respect to FIG. 18A and others herein.

Figure 19B:
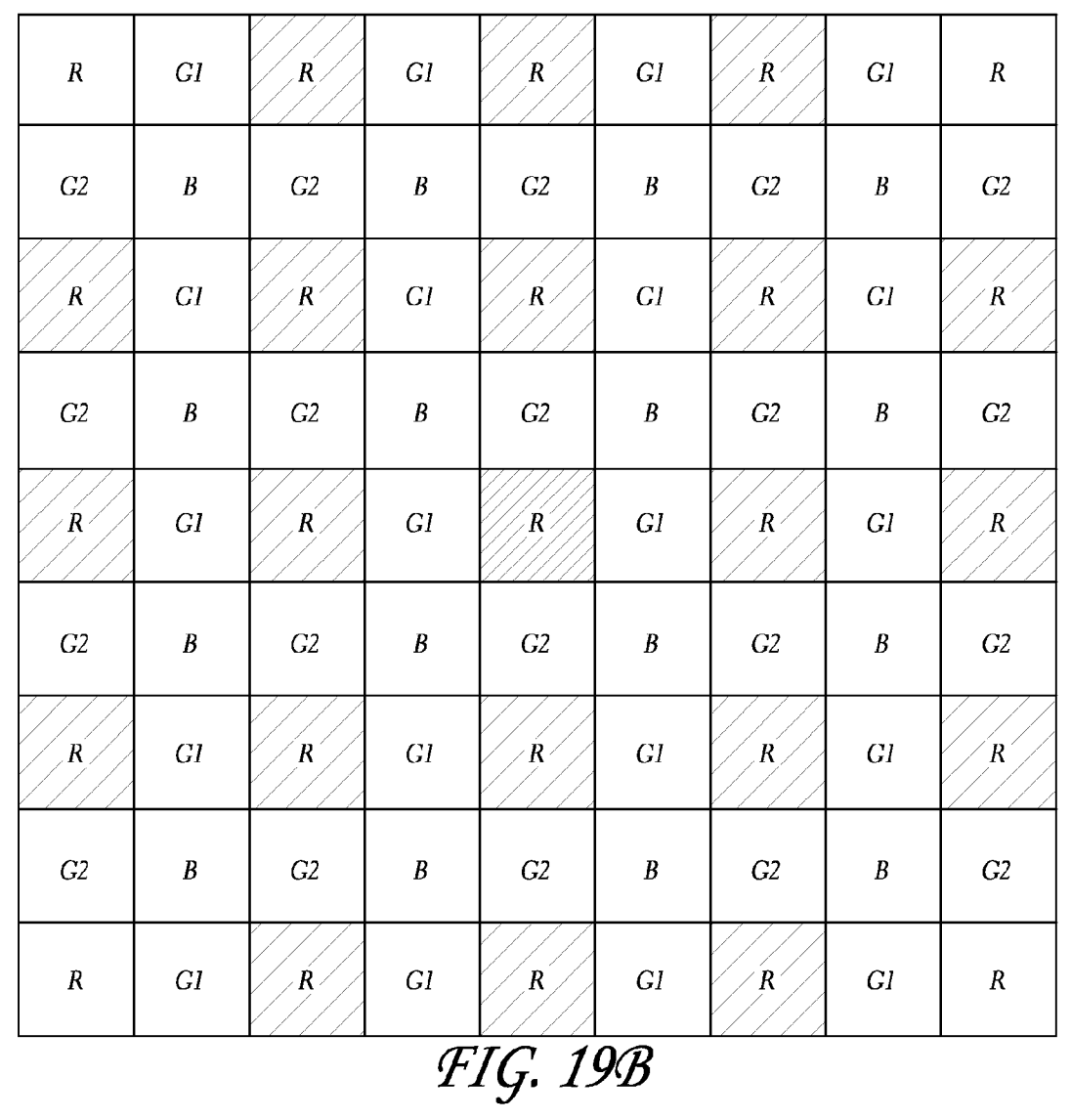
Figure 19C:
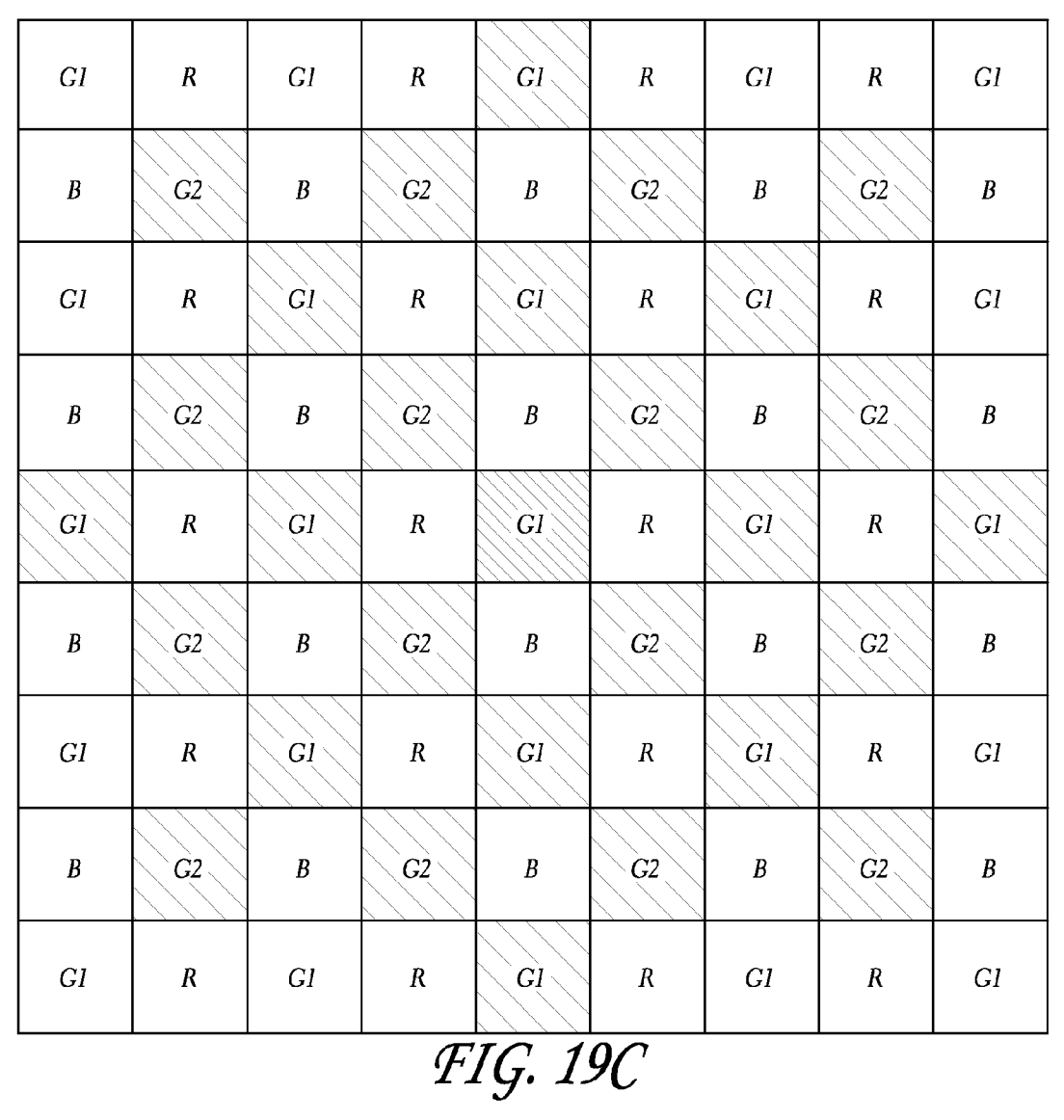

Continuing to block 192, a set of pixels that neighbor the current pixel is selected and a spatial function is applied to the neighboring pixels. FIGS. 19B-19C illustrate sample layouts of surrounding blue, red, and green pixels that can be used as data points to supply as input to the spatial function. In FIG. 19B, a sample kernel with 21 taps or points of red image data is shown. As can be seen in FIG. 19B, the sample has a substantially circular pattern and shape. Of note, a sampling of points similar to that in FIG. 19B can be used for blue picture elements.

In FIG. 19C, a sampling of data points that neighbor a current pixel with green data is shown. As shown, the sample includes 29 data points that form a substantially circular pattern. Of note, FIGS. 19B-19C illustrate exemplary embodiments and other numbers of data points and shapes can be selected for the sample depending on the extent of noise removal needed and hardware constraints of camera 10.

With further reference to block 192, the spatial function typically weights pixels surrounding the current pixel being denoised based on the difference in brightness levels between the current pixel and the surrounding pixel, the brightness level of the current pixel, and the distance of the surrounding pixel from the current pixel. In some embodiments, some or all three of the factors described (as well as others) can be used by the spatial function to denoise the current pixel.

Figure 19D:
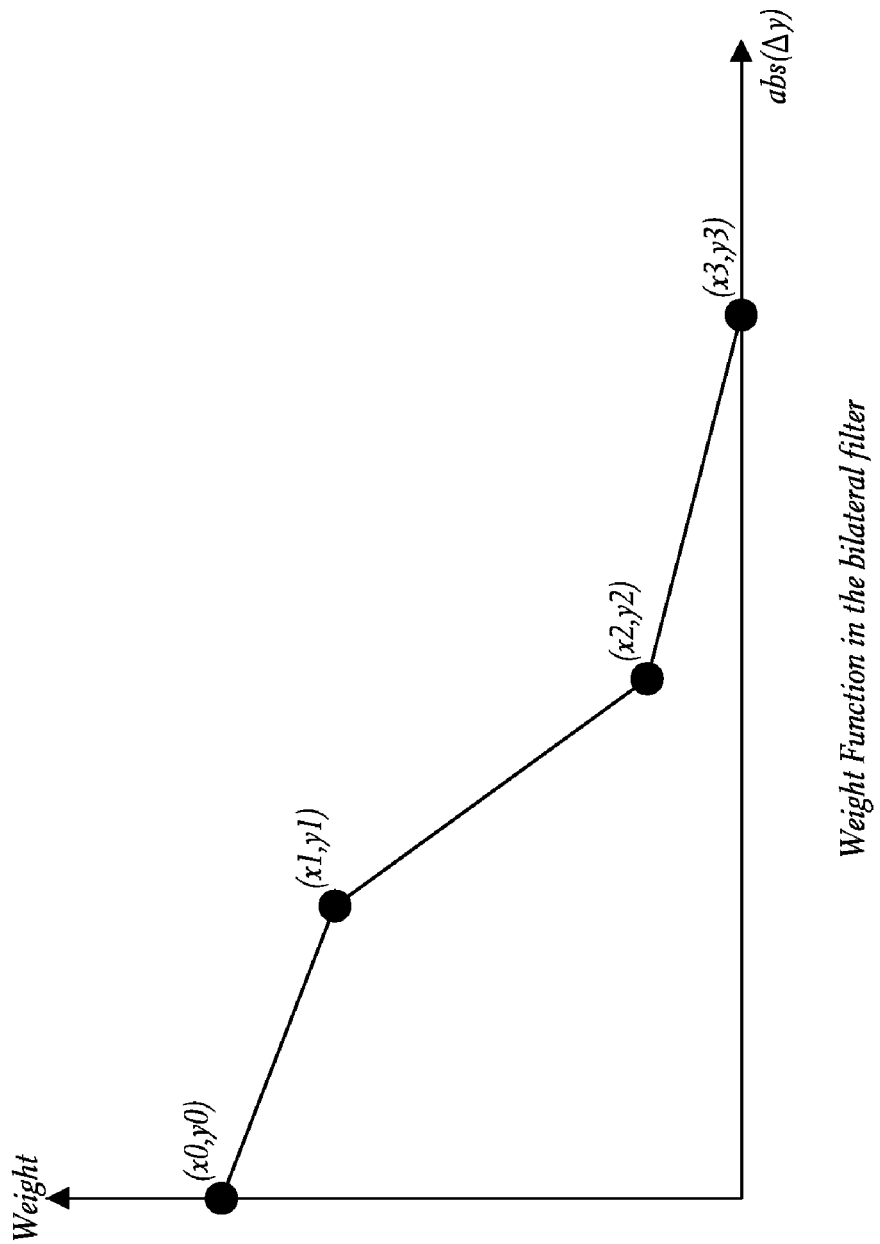
FIGS. 19D-F illustrate exemplary weighting functions that can be applied by the noise removal routines of FIG. 18A.

In some embodiments, the absolute difference between the brightness level of the current pixel being denoised and each of the neighboring pixels can be calculated to determine the strength of the denoise for each neighboring pixel. Alternatively, as shown in FIG. 19D, an exemplary weight function that applies a bilateral filter can be applied to achieve this effect. In FIG. 19D, the current pixel is provided as the x input to the weight function and the surrounding pixel is provided as the y input. As can be seen in FIG. 19D, the weight function can be generally symmetrical about the x axis. The right side of the weight function can include 3 line segments. Depending on which line segment the current pixel and surrounding pixel fall, the result of the weight function can result in one of three values. In some embodiments, the end points of the weight function (x0, y0) and (x3, y3) can be fixed at the coordinates (0, 1) and (1, 0), respectively. The coordinates of the two middle points (x1, y1) and (y2, x2) can be programmable. Of note, a combination of a fixed and programmable arrangement of coordinates can reduce computation time while still providing accuracy. In some embodiments, weight functions that have substantially similar properties as the exemplary function of FIG. 19D can also be used.

Figure 19E:
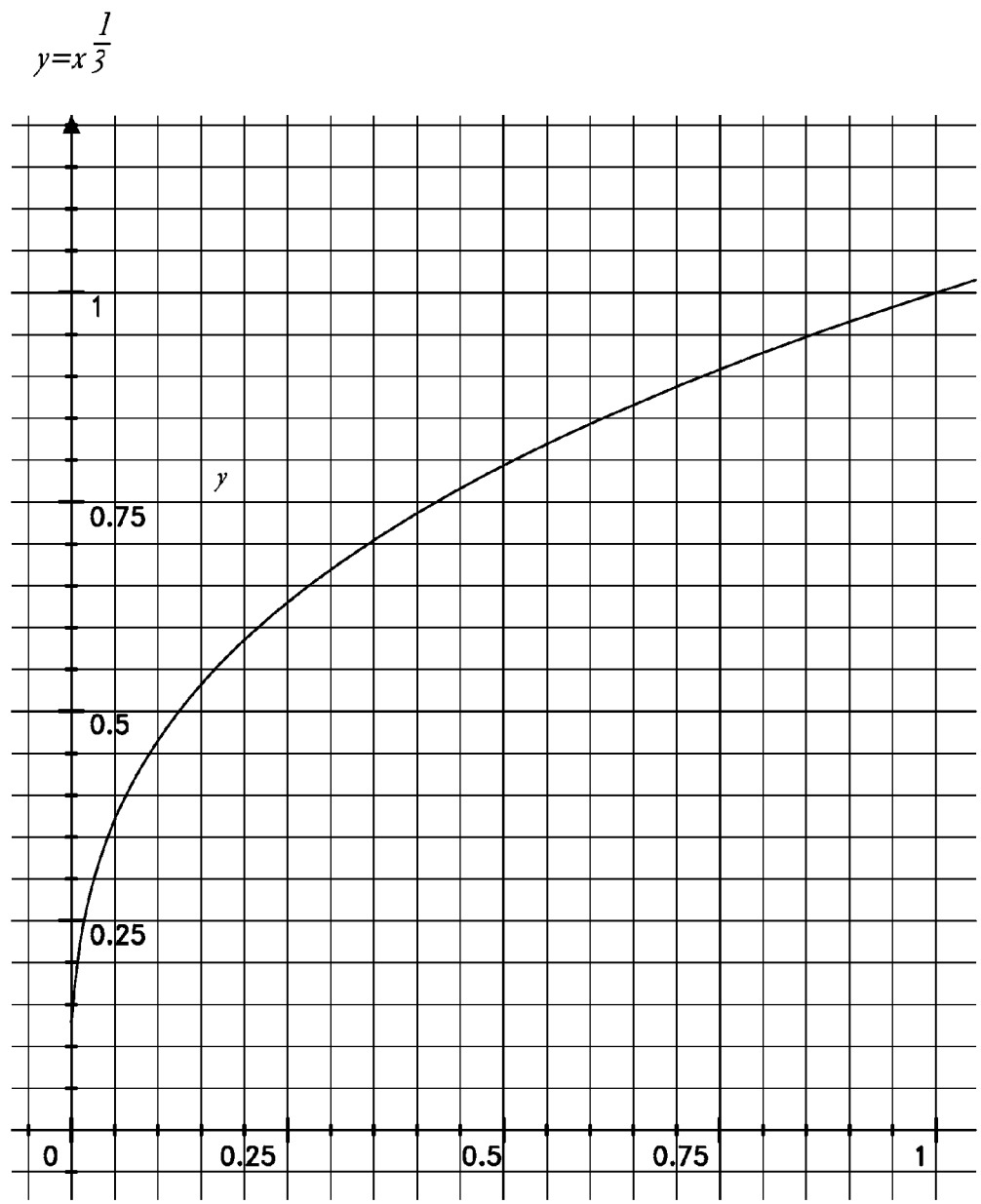
Figure 19F:
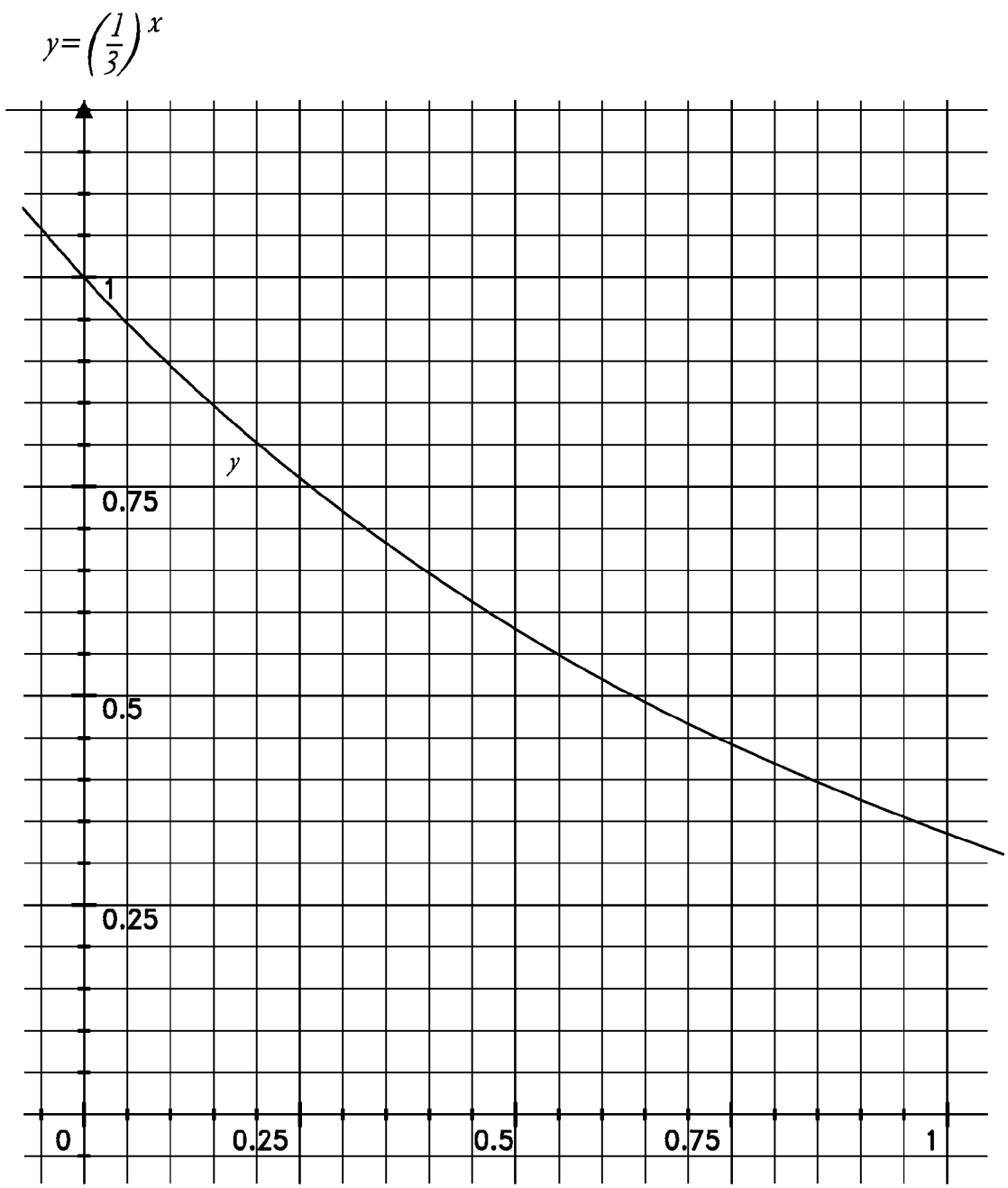

As previously described, the brightness level of the current pixel being denoised can also be used by the spatial function to denoise the current pixel. FIGS. 19E-19F illustrate exemplary weighting functions that can be used to adjust the spatial denoising function to account for darker regions of an image. Generally, the curve shown in FIG. 19E can be represented by the function: $Y=X^{1/3}$. The curve shown in FIG. 19F can be generally represented by the function $Y=(1/3)^x$. Both FIGS. 19E-19F receive the brightness (or absolute brightness) of the pixel being denoised as input x, and output a weighted brightness value as y. In some embodiments, curve families having substantially similar properties can also be used.

With continued to reference to block 192, the distance of each surrounding pixel from the current pixel being denoised can also be used to control how strong the denoise effect is. In exemplary embodiments, FIGS. 19B-19C, both of which have been previously described, can be used to separate the neighboring pixels into two groups based on their distance from the current pixel. Depending on which group the neighboring pixel falls in, it can be given a certain weight in the spatial denoise function. For example, pixels further away from the current pixel can be weighted less, whereas, pixels closer to the current pixel can be weighted more heavily. In some embodiments, three or more groups can be used to differentiate neighboring pixels based on distance.

Continuing to operation block 192, the spatial function finishes calculating a denoised pixel value for the current pixel that weights surrounding pixels based on the difference in brightness levels between the current pixel and each surrounding pixel, the brightness level of the current pixel, and the distance of each surrounding pixel from the current pixel. After the denoised pixel value is calculated the current pixel is set to the denoised pixel value.

Figure 20:
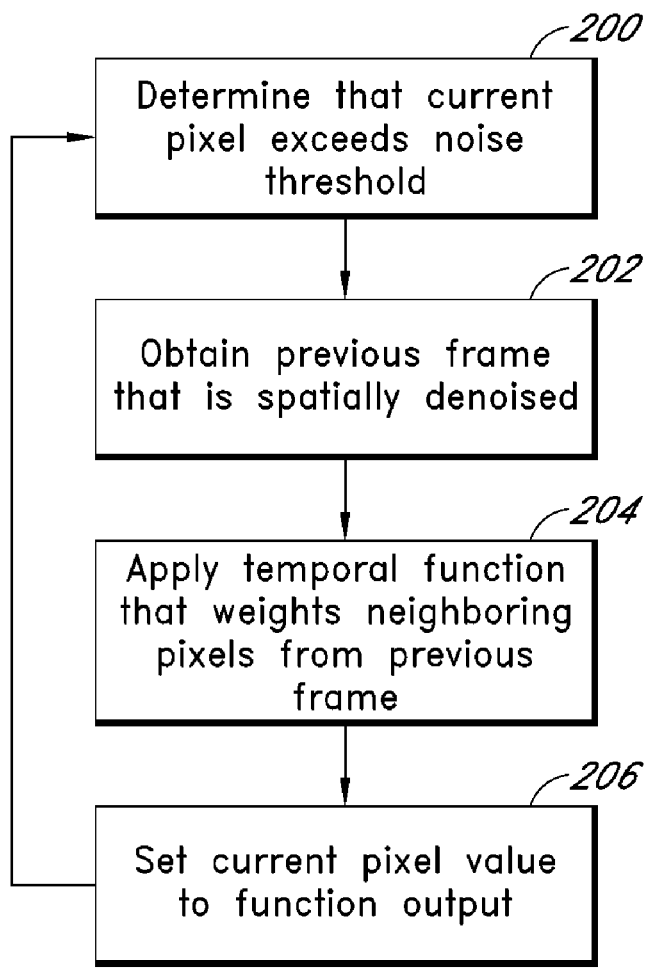
FIG. 20 is a flowchart illustrating a temporal denoising routine performed by exemplary components of the system illustrated in FIG. 1.

FIG. 20 illustrates an exemplary method of temporal noise removal from a frame of video or image data. The exemplary method may be stored as a process accessible by the image processing module 20, compression module 22, and/or other components of the camera 10. Depending on the embodiment, certain of the blocks described below may be removed, others may be added, and the sequence of the blocks may be altered.

Beginning in operation block 200, a current pixel in an image frame is selected and checked against a threshold to determine whether the current pixel exceeds a noise threshold. An artisan will recognize that a variety of techniques can be used to determine whether the current pixel exceeds a noise threshold, including those described with respect to FIG. 18A and others herein.

Moving to block 202, a previous frame that is spatially denoised is obtained. For example, after the denoising routine of FIG. 19A is run on a previous frame that frame can be selected. Alternatively, a cumulative frame or a prior frame that is not yet denoised can be used.

Continuing to block 204, the temporal function weights pixels surrounding the current pixel being denoised from the previous frame(s) based on the difference in brightness levels between the current pixel and the surrounding pixels, the brightness level of the current pixel, and the distance of the surrounding pixels from the current pixel. In some embodiments, some or all three of the factors described (as well as others) can be used by the temporal function to denoise the current pixel.

With further reference to block 204, a set of pixels that neighbor the current pixel in the previous frame are selected and a temporal function is applied to the neighboring pixels. Previously described FIGS. 19B-19C which illustrate sample layouts of surrounding blue, red, and green pixels in a previous frame can be used as data points in the temporal function, in addition to the current pixel being denoised in the current frame. In addition, previously described FIG. 19D which illustrates a weight function to determine the strength of the denoise for each neighboring pixel based on its brightness level can also be used. In some embodiments, a distance weighting function that weights surrounding pixels in the previous frame based on their distance from the current pixel can be used to control how the strong the denoising effect is. The brightness level of the current pixel being denoised can also be used, in some embodiments, by the temporal function. FIGS. 19E-19F illustrate exemplary weighting functions that can be used to adjust the temporal denoising function to account for darker regions of an image. Of note, other curves and families of curves can be used.

Continuing to operation block 206, the spatial function finishes calculating a denoised pixel value for the current pixel that weights surrounding pixels from the previous frame based on the difference in brightness levels between the current pixel in the current frame and each surrounding pixel, the brightness level of the current pixel, and the distance of the surrounding pixel from each current pixel. After the denoised pixel value is calculated, the current pixel can be set to the denoised pixel value.

What is claimed is:

1. A method of reducing noise in an image, the method comprising:
   receiving frames of image data, each frame of image data comprising first image data representing only a first color, second image data representing only a second color, and third image data representing only a third color;
   enhancing the compressibility of the image data by modifying, using at least one processor, the first image data and the second image data in a current frame based on an average of the third image data; and
   reducing noise in the image data by, using at least one processor, applying a spatial function to adjust image data within spatial proximity to each other in the current frame.

2. The method of claim 1, further comprising, in response to determining that an amount of noise in a noisy pixel exceeds a threshold value, calculating a median using pixels that surround the noisy pixel and are of the same color, and setting the noisy pixel to the median.

3. The method of claim 2, wherein the image data corresponds to linear light sensor data, and wherein the threshold is determined based at least in part on the brightness of an image region in which the noisy pixel resides.

4. The method of claim 1, wherein the adjusting image data within spatial proximity comprises calculating a value that weights image data of a plurality of pixels which neighbor a noisy pixel based on at least one of distance of the neighboring pixels from the noisy pixel, difference in brightness between the noisy pixel and the neighboring pixels, and brightness of the noisy pixel, and setting the noisy pixel to the value, wherein the weights determine the relative contributions of the weighted pixels to the calculated value.

5. The method of claim 1, further comprising adjusting the current frame based on the previous frame, wherein the adjusting the current frame comprises calculating a value that weights image data of a plurality of pixels which surround a noisy pixel in the previous frame based on at least one of distance of the neighboring pixels from the noisy pixel, difference in brightness between the noisy pixel and the neighboring pixel, and brightness of the noisy pixel, and setting the noisy pixel in the current frame to the value, wherein the weights determine the relative contributions of the weighted pixels to the calculated value.

6. The method according to claim 1, wherein the third image data represents green image data, and the image data comprises Bayer pattern data that has not yet been demosaiced.

7. The method of claim 1, wherein the adjusting image data within spatial proximity comprises calculating a value that weights image data of a plurality of pixels which neighbor a noisy pixel and setting the noisy pixel to the calculated value, wherein the image data of the plurality of neighboring pixels and the image data of the noisy pixel contribute to the calculated value.

8. The method of claim 1, wherein the modifying the first image data and the second image data comprises reducing entropy in the image data by subtracting an average of the third image data from at least one of the first image data and the second image data.

9. A video camera comprising:
  a light sensitive device configured to convert light from a lens assembly into a raw signal of image data representing at least first, second, and third colors of the light; and
  an image processor that receives frames comprising image data including first image data representing only a first color, second image data representing only a second color, and third image data representing only a third color, enhances compressibility of the image data by modifying image data of the first and second colors based on an average of the third color, and reduces noise in the image data by applying a spatial function to image data within spatial proximity to each other in a current frame.

10. The video camera of claim 9, wherein, in response to determining that an amount of noise in a noisy pixel exceeds a threshold value, the image processor calculates a median for pixels near the noisy pixel and of the same color, and sets the value of the noisy pixel to the median.

11. The video camera of claim 10, wherein the image data corresponds to linear light sensor data, and wherein the threshold is determined based at least in part on the brightness of an image region in which the noisy pixel resides.

12. The video camera of claim 9, wherein the image processor adjusts image data within spatial proximity comprises calculating a value that weights image data of a plurality of pixels which neighbor a noisy pixel based on at least one of distance of the neighboring pixels from the noisy pixel, difference in brightness between the neighboring picture elements and the noisy pixel, and brightness of the noisy pixel, and setting the noisy pixel to the value, wherein the weights determine the relative contributions of the weighted pixels to the calculated value.

13. The video camera of claim 12, wherein the neighboring pixels comprise at least 21 data points that form a substantially circular pattern around the noisy pixel.

14. The video camera of claim 9, wherein the image processor further adjusts the current frame based on the previous frame at least in part by calculating a value that weights image data of a plurality of pixels which surround a noisy pixel in the previous frame based on at least one of distance of the neighboring pixels from the noisy pixel, difference in brightness between the noisy pixel and the neighboring pixels, and brightness of the noisy pixel, and setting the noisy pixel in the current frame to the value, wherein the weights determine the relative contributions of the weighted pixels to the calculated value.

15. The video camera of claim 9, wherein the spatial function calculates a value that weights image data of a plurality of pixels which neighbor a noisy pixel and sets the noisy pixel to the calculated value, wherein the image data of the plurality of neighboring pixels and the image data of the noisy pixel contribute to the calculated value.

16. The video camera of claim 9, wherein the image data comprises Bayer pattern data that has not yet been demosaiced.

17. The video camera of claim 9, wherein the image processor modifies the image data by subtracting an average of image data of the third color from image data of the first and second colors, thereby reducing entropy in the image data.

18. An image processing device for reducing noise in imaging data, the image processing device comprising:
  a computer memory that stores image data comprising first picture elements representing only a first color, second picture elements representing only a second color, and third picture elements representing only a third color; and
  a processor that removes noise from the picture elements by applying a spatial denoising function to the image data, enhances the compressibility of the image data by modifying picture elements of at least one of the first and second colors based on picture elements of the third color, and compresses the modified, denoised image data,
  wherein the spatial denoising function calculates a value that weights image data of a plurality of picture elements which neighbor a noisy picture element and sets the noisy picture element to the calculated value, wherein the image data of the plurality of neighboring picture elements and the image data of the noisy picture element contribute to the calculated value.

19. The image processing device of claim 18, wherein the image data comprises Bayer pattern data that has not yet been demosaiced.

20. The image processing of claim 18, wherein the processor modifies the picture elements by subtracting an average of picture elements of the third color from picture elements of at least one of the first color and the second color, thereby reducing entropy in the image data.

21. The image processing device of claim 18, wherein the processor removes noise prior to modifying picture elements of at least one of the first and second colors based on the third color.

22. The image processing device of claim 18, wherein the processor removes noise after modifying picture elements of at least one of the first and second colors based on the third color.

23. The image processing device of claim 18, wherein the processor further calculates a median for neighboring picture elements having the same color as the noisy picture element and, in response to determining that an amount of noise in the noisy picture element exceeds a threshold value, sets the noisy picture element to the median.

24. The image processing device of claim 23, wherein the neighboring picture elements comprise at least 8 data points that form a substantially diamond like shape around the noisy picture element.

25. The image processing device of claim 23, wherein the image data corresponds to linear light sensor data, and wherein the threshold is determined based at least in part on the brightness of an image region in which the noisy picture element resides.

26. The image processing device of claim 18, wherein the spatial denoising function calculates the value that weights the image data of the plurality of picture elements which neighbor the noisy picture element based on at least one of distance of the neighboring picture elements from the noisy picture element, difference in brightness between the neighboring picture elements and the noisy picture element, and brightness of the noisy picture element, wherein the weights determine the relative contributions of the weighted picture elements to the calculated value.

27. The image processing device of claim 18, wherein the processor further applies temporal denoising, the temporal denoising comprising calculating a value that weights image data of a plurality of picture elements which neighbor the noisy picture element in a previous frame based on at least one of distance of the neighboring picture elements from the noisy picture element, difference in brightness between the neighboring picture elements and the noisy picture element, and brightness of the noisy picture element, and setting the noisy picture element in a current frame to the value, wherein the weights determine the relative contributions of the weighted pixels to the calculated value.

* * * * *

UNITED STATES PATENT AND TRADEMARK OFFICE
CERTIFICATE OF CORRECTION

PATENT NO. : 8,237,830 B2
APPLICATION NO. : 12/422507
DATED : August 7, 2012
INVENTOR(S) : Jannard et al.

It is certified that error appears in the above-identified patent and that said Letters Patent is hereby corrected as shown below:

Title page, (item 75, Inventors) line 2-3, Change "Kars, CA (US)" for Thomas Graeme Nattress to --Kars (CA)--.

Title page, (item 57, Abstract) line 9, Change "demosacied." to --demosaiced.--.

In column 2 (Title page 2 item 56) line 37, Under Other Publications, Change "Arrflex" to --Arriflex--.

In column 2 (Title page 2 item 56) line 37, Under Other Publications, Change "Diqial" to --Digital--.

In column 2 (Title page 2 item 56) line 39, Under Other Publications, Change "=_32" to --=32--.

In column 1 (Title page 3 item 56) line 7, Under Other Publications, Change "Diqital" to --Digital--.

In the Drawings

Sheet 8 of 31 (Reference Numeral 58, FIG. 8) at line 2, Change "Algorithim" to --Algorithm--.

Sheet 9 of 31 (Reference Numeral 58, FIG. 8A) at line 2, Change "Algorithim" to --Algorithm--.

Sheet 13 of 31 (Reference Numeral 62, FIG. 12) at line 2, Change "Algorithim" to --Algorithm--.

Sheet 14 of 31, (Reference Numeral 62, FIG. 12A) at line 2, Change "Algorithim" to --Algorithm--.

In the Specification

In column 7 line 23, Change "and or" to --and/or--.

Signed and Sealed this
Eighteenth Day of February, 2014

Michelle K. Lee
*Deputy Director of the United States Patent and Trademark Office*

In column 12 line 17, Change "$0.01 \leq g \leq 1$" to --$0.01 < g < 1$--.

In column 15 line 29, Change "70'" to --70'.--.

In column 15 line 33, Change "demosacied" to --demosaiced--.

In column 15 line 48, Change "Demosiacing" to --Demosaicing--.

In the Claims

In column 22 at line 59, In Claim 20, after "processing" insert --device--.